(12) United States Patent
Lau et al.

(10) Patent No.: US 12,092,606 B2
(45) Date of Patent: Sep. 17, 2024

(54) COMPOSITIONS AND KITS COMPRISING INTERPENETRATING POLYMER NETWORK FOR CAPILLARY ELECTROPHORESIS

(71) Applicant: Hongene Biotech Corporation, Union City, CA (US)

(72) Inventors: Aldrich N. K. Lau, Palo Alto, CA (US); Jingshe Song, Union City, CA (US)

(73) Assignee: Hongene Biotech Corporation, Union City, CA (US)

( * ) Notice: Subject to any disclaimer, the term of this patent is extended or adjusted under 35 U.S.C. 154(b) by 0 days.

(21) Appl. No.: 18/039,691

(22) PCT Filed: Dec. 14, 2021

(86) PCT No.: PCT/US2021/072913
§ 371 (c)(1),
(2) Date: May 31, 2023

(87) PCT Pub. No.: WO2022/133439
PCT Pub. Date: Jun. 23, 2022

(65) Prior Publication Data
US 2024/0118238 A1 Apr. 11, 2024

Related U.S. Application Data

(60) Provisional application No. 63/126,941, filed on Dec. 17, 2020.

(51) Int. Cl.
*G01N 27/447* (2006.01)
*C08L 33/26* (2006.01)

(52) U.S. Cl.
CPC ........ *G01N 27/44747* (2013.01); *C08L 33/26* (2013.01)

(58) Field of Classification Search
None
See application file for complete search history.

(56) References Cited

U.S. PATENT DOCUMENTS

| | | |
|---|---|---|
| 1,055,345 A | 3/1913 | McMahon |
| 5,347,527 A | 9/1994 | Favre et al. |
| 5,534,123 A | 7/1996 | Bashkin et al. |
| 5,750,015 A | 5/1998 | Soane et al. |
| RE37,606 E | 3/2002 | Guttman |
| 6,706,162 B1 | 3/2004 | Voss et al. |
| 6,770,698 B1 | 8/2004 | Chu et al. |
| 6,926,815 B2 | 8/2005 | Liu et al. |
| 7,932,333 B2 | 4/2011 | Brothers et al. |
| 7,932,339 B2 | 4/2011 | Braun et al. |
| 8,221,607 B2 | 7/2012 | Voss et al. |
| 8,366,900 B2 | 2/2013 | Voss et al. |
| 8,734,630 B2 | 5/2014 | Voss et al. |
| 8,784,627 B2 | 7/2014 | Lau |
| 9,625,416 B2 | 4/2017 | Voss et al. |
| 9,671,367 B2 | 6/2017 | Lau |
| 9,840,636 B2 | 12/2017 | Viovy et al. |
| 9,964,517 B2 | 5/2018 | Voss et al. |
| 10,551,345 B2 | 2/2020 | Lau |
| 2004/0016702 A1* | 1/2004 | Hennessy ............ B01J 20/3293 210/660 |
| 2004/0101970 A1 | 5/2004 | Viovy et al. |
| 2005/0025741 A1 | 2/2005 | Lau |

FOREIGN PATENT DOCUMENTS

WO    WO 00/42423    7/2000

OTHER PUBLICATIONS

Ausbel et al., Current Protocols in Molecular Biology, John Wiley & Sons, 1993, including supplements through Aug. 2000 (TOC).
Barbier et al., 2004, Thermally induced gelation of poly(acrylamide)grafted with poly(N-isopropylacrylamide): a small-angle neutron scattering study, Macromolecules, 37:5682-5691.
Belder et al., 2001, Cross-linked poly(vinyl alcohol) as permanent hydrophilic col. coating for capillary electrophoresis, Electrophoresis, 22:3813-3818.
Chiari et al., 1995, Capillary electrophoretic separation of proteins using stable, hydrophilic poly(acryloylaminoethoxyethanol)-coated columns J. Chromatography A, 717:1-13.
Chiari et al., 1998, Separation of oligonucleotides and DNA fragments by capillary electrophoresis in dynamically and permanently coated capillaries, using a copolymer of acrylamide and B-D-glucopyranoside as a new low viscosity matrix with high sieving capacity, Electrophoresis, 19:3154-3159.
Chiari et al., 2000, A new absorbed coating for DNA fragment analysis by capillary electrophoresis, Electrophoresis, 21:1521-1526.
Chiari et al., 2000, New adsorbed coatings for capillary electrophoresis, Electrophoresis, 21:909-916.
Cobb et al., 1990, Electrophoretic separations of proteins in capillaries with hydrolytically stable surface structures, Anal. Chem. 62:2478-2483.
Doherty et al., 2002, Critical factors for high-performance physically adsorbed (dynamic) polymeric wall coatings for capillary electrophoresis of DNA, Electrophoresis, 23:2766-2776.
Horvath et al., 2001, Polymer wall coatings for capillary electrophoresis, Electrophoresis, 22:644-655.

(Continued)

*Primary Examiner* — J. Christopher Ball
(74) *Attorney, Agent, or Firm* — Knobbe, Martens, Olson & Bear, LLP

(57) ABSTRACT

Embodiments of the present application relate to compositions comprising a sieving component, and a surface interactive component comprising an interpenetrating polymer network that includes comprising a hydrophilic N-vinyl amide polymer and a hydrophilic acrylamide polymer. The compositions are used for separating analytes by capillary electrophoresis. Kits and methods including the compositions for separating analytes by capillary electrophoresis are also provided.

27 Claims, 9 Drawing Sheets

(56) References Cited

OTHER PUBLICATIONS

Jorgenson, 1992, Capillary electrophoresis: an introduction, Methods: A Companion to Methods in Enzymology, 4:179-190.

Lucy et al., 2008, Non-covalent capillary coatings for protein separations in capillary electrophoresis, J. Chromatograph A, 1184:81-105.

Melanson et al., 2001, Dynamic capillary coatings for electroosmotic flow control in capillary electrophoresis, Trends in Analytical Chemistry, 20(6+7):365-374.

Sambrook et al., 1989, Molecular Cloning: A Laboratory Manual, Second Edition, Cold Spring Harbor Laboratory, New York (TOC).

Sebastiano et al., 2001, ω-iodoalkylammonium salts as permanent capillary silica wall modifiers—comparative analysis of the structural parameters and substituent effects, J. Chromatograph A, 924:71-81.

Sudor et al., 2001, New block-copolymer thermoassociating matrices for DNA sequencing: effect of molecular structure on rheology and resolution, Electrophoresis, 22:720-728.

Verzola et al., 2000, Quantitative studies on the adsorption of proteins to the bare silica wall in capillary electrophoresis. II. Effects of adsorbed, neutral polymers on quenching the interaction, J. Chromatograph A, 874:293-330.

International Search Report and Written Opinion dated Mar. 8, 2022 in international application No. PCT/US2021/072913, filed Dec. 14, 2021.

* cited by examiner

IPN

COMPOSITIONS AND KITS COMPRISING INTERPENETRATING POLYMER NETWORK FOR CAPILLARY ELECTROPHORESIS

BACKGROUND

Field

The present application relates to compositions containing interpenetrating polymer networks for separating analytes by capillary electrophoresis. Kits and methods for separating analytes by capillary electrophoresis are also provided.

Description of the Related Art

Capillary electrophoresis has been applied widely as an analytical technique because of several technical advantages: (i) capillaries have high surface-to-volume ratios which permit more efficient heat dissipation which, in turn, permit high electric fields to be used for more rapid separations; (ii) the technique requires minimal sample volumes; (iii) superior resolution of most analytes is attainable; and (iv) the technique is amenable to automation. Because of these advantages, there has been great interest in applying capillary electrophoresis to the separation of biomolecules, particularly nucleic acids.

One factor that may complicate separations by capillary electrophoresis is the phenomena of electro-osmosis, which is fluid flow in a capillary induced by an electrical field. Electro-osmosis is alternatively referred to as electro-osmotic flow (EOF). EOF complicates the application of capillary electrophoresis in situations where high resolution separations are sought, such as in the analysis of DNA sequencing fragments. EOF can occur during capillary electrophoresis when the surface of the inner wall of the capillary contains immobilized charges. Such charges can cause the formation of a mobile layer of counter ions which, in turn, moves in the presence of an electrical field to create a bulk flow of liquid. The magnitude of the EOF is variable and is controlled by several factors, including variation in the distribution of charges, selective adsorption of components of the analyte and/or separation medium, pH of the separation medium, and the like.

The variable magnitude of the EOF can reduce resolution of closely spaced analyte bands, many attempts have been made to directly or indirectly control EOF in capillary electrophoresis applications. The attempts have included covalent coating or modification of the surface of the inner wall of the capillary to suppress charged groups, use of high viscosity polymers, adjustment of buffer pH and/or concentration, use of a gel separation medium for covalently coating the capillary wall, and the application of an electric field radial to the axis of the capillary.

Precoated capillaries can control the magnitude of EOF during capillary electrophoresis of nucleic acid fragments. Precoated capillary tubes typically are expensive to make, have a limited lifetime, and can be subject to reproducibility problems. These problems are particularly important with large scale capillary electrophoresis using multiple capillaries run in parallel. There exists a need for compositions having improved properties for the control of EOF in capillary electrophoresis.

SUMMARY

Figure 1A:
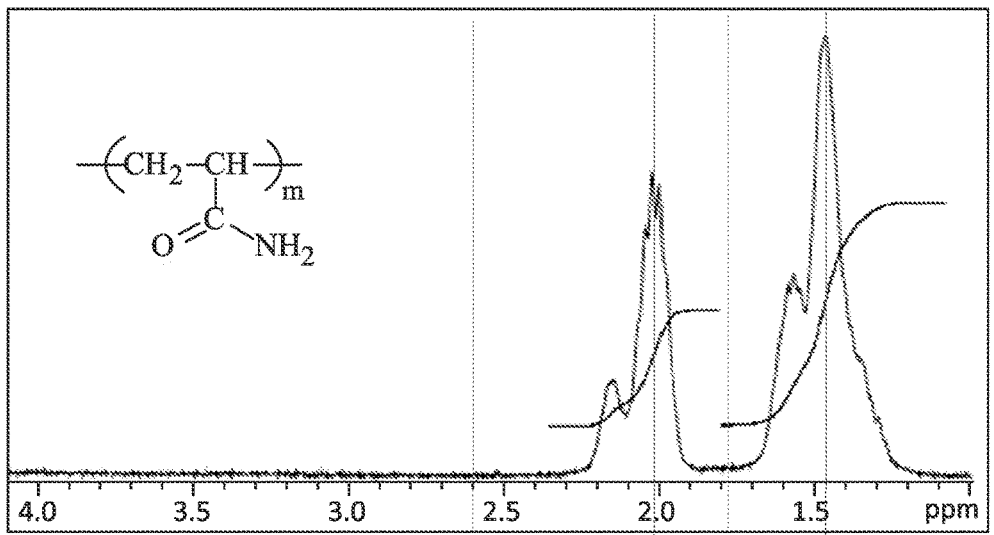
FIG. 1A illustrates a $^1$H NMR spectrum measured in $D_2O$ of a non-crosslinked hydrophilic polyacrylamide according to an embodiment of the present application.

Some aspects of the present application relate to compositions for separating analytes by capillary electrophoresis, comprising: a sieving component comprising a first non-crosslinked hydrophilic acrylamide polymer; and a surface interactive component comprising an interpenetrating polymer network (IPN), the IPN comprising at least one non-crosslinked hydrophilic N-vinyl amide polymer and a second non-crosslinked hydrophilic acrylamide polymer. In some embodiments, the IPN is hydrophilic. In some embodiments, the composition does not include any crosslinked polymer. In some embodiments, the composition of the present application is for single-base resolution sequencing of DNA fragments or other polynucleotide fragments.

Some aspects of the present application relate to kits for capillary electrophoresis. In some embodiments, the kits comprise one or more uncoated capillaries and a composition for separating analytes by capillary electrophoresis as described herein.

Other aspects of the present application relate to methods for separating analytes by capillary electrophoresis, comprising: separating the analytes by capillary electrophoresis in a composition described herein. The method uses a capillary electrophoresis apparatus comprising: an uncoated capillary; a composition for separating analytes by capillary electrophoresis as described herein that is located within the uncoated capillary; wherein the apparatus does not include a crosslinked polymer gel. In some further embodiments, the method comprising: inserting an uncoated capillary having a first end and a second end into a composition described herein; loading a sample of different sized analytes in the capillary; and applying an electrical field between the first and second ends of the capillary so that the different sized analytes in the sample migrate through the capillary, thereby separating the analytes. In some embodiments, the methods are conducted using one or more kits described herein.

DETAILED DESCRIPTION

Embodiments of the present disclosure relate to compositions for separating analytes by capillary electrophoresis. In particular, the compositions include a hydrophilic sieving component comprising a first non-crosslinked acrylamide polymer; and a hydrophilic surface interactive component comprising an interpenetrating polymer network (IPN). In some embodiments, the IPN comprising at least one non-crosslinked hydrophilic N-vinyl amide polymer and a second non-crosslinked acrylamide polymer. In some embodiments, both the sieving component and the surface interactive component are completely water soluble. The compositions are particularly useful for separating polynucleotides (e.g., DNA molecules or fragments) or oligonucleotides. The hydrophilic IPN is an effective suppressor of EOF, as compared to surface interactive components made from other non-crosslinked N-substituted polyacrylamides, e.g., poly(N,N-dimethylacrylamide) (PDMA). Some N-substituted polyacrylamides such as PDMA exhibit Low Critical Solution Temperature (LCST) characteristics that can impair separation of analytes. The compositions of the present application provide high resolution and short run time when used in capillary for electrophoresis (for example, used in fused silica capillary for separating DNA fragments). Furthermore, the compositions have improved stability under ambient temperature and does not require refrigeration in storage.

Definitions

The section headings used herein are for organizational purposes only and are not to be construed as limiting the subject matter described.

As used herein, the term "N-vinyl amide" and "N-vinyl amide monomer" include but not limited to a compound having the formula $H_2C=CR^1-NR^2-C(=O)-R^3$; where $R^1$ can be independently H or methyl, $R^2$ can be independently H, unsubstituted or substituted $C_1$-$C_6$ alkyl, unsubstituted or substituted phenyl, or $-CH_2C(=O)NR^4R^5$, and $R^3$ can be independently unsubstituted or substituted $C_1$-$C_6$ alkyl. Each of $R^4$ and $R^5$ can be independently H, unsubstituted $C_1$-$C_6$ alkyl, or $R^4$ and $R^5$ together with the nitrogen atom to which they are attached form an optionally substituted 5 or 6 membered heterocyclyl. One example of an N-vinyl amide monomer is $H_2C=CH-N(CH_3)-C(=O)CH_3$.

As used herein, the term "acrylamide" and "acrylamide monomer" include but not limited to a compound having the formula $H_2C=CR^6-C(=O)NR^7R^8$; where $R^6$ can be independently H or methyl, $R^7$ and $R^8$ can be independently H, $C_1$-$C_6$ alkyl, $-(CH_2)_mOH$, $-CH_2CH(OH)(CH_2)_nR^9$, $-CH(CH_2OH)CH(OH)CH_3$, $-CH_2CH_2(OCH_2CH_2)_p-OR^{10}$,

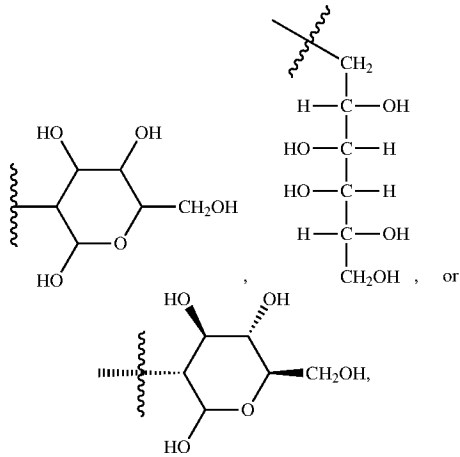

and each of $R^9$ and $R^{10}$ can be independently H or $C_1$-$C_6$ alkyl. The values for integers m and n are 1, 2, 3, 4, or 5; and the value of p ranges from 1 to 200. One example of the acrylamide monomer is $H_2C=CH-C(=O)NH_2$.

As used herein, the term "average molecular weight" is the weight-average molecular weight (Mw) of a sample population made up of polymer species having a multiplicity of molecular weights. This quantity is defined by the equation:

$$M_w = \left(\sum_{i=1}^{\infty} n_i \times (M_i)^2\right) / \sum_{i=1}^{\infty} n_i \times M_i$$

where $n_i$ indicates the number of molecules of species $i$ and $M_i$ is the molecular weight of $i^{th}$ species. As used herein, the term "molecular weight" refers to weight average molecular weight, unless otherwise specified.

As used herein, the term "capillary" is a tube or channel or other structure for carrying out electrophoresis that can support a volume of separation medium, such as a composition for separating analytes, as disclosed herein. The geometry of a capillary may vary widely and includes, but is not limited to, tubes with circular, rectangular or square cross-sections, channels, grooves, plates, and the like, and may be fabricated by a wide range of technologies. An important feature of a capillary for use with certain embodiments of the present application is the surface-to-volume ratio of the surface in contact with the volume of separation medium. High values of this ratio typically permit better heat transfer from the separation medium during electrophoresis. In certain embodiments, values in the range of about 0.8 to 0.02 μm$^{-1}$ are employed. These correspond to the surface-to-volume ratios of tubular capillaries with circular cross-sections having inside diameters in the range of about 5 μm to about 200 μm.

As used herein, the term "uncoated capillary" is capillary that is uncoated prior to the introduction of compositions of the present application, i.e., not covalently coated prior to use. In certain embodiments, capillaries for use with the compositions of the present application are made of silica, fused silica, quartz, silicate-based glass, such as borosilicate glass, phosphate glass, alumina-containing glass, and the like, or other silica-like materials. In certain embodiments, plastic channel capillaries are used. Plastic channel capillaries may comprise, for example, polyacrylates and polyolefins, such as LUCRYL® (BASF, Germany), TPX™ (Matsui Plastics, Inc., White Plains, NY), TOPAS® (Hoechst Celane.se Corp., Summit, NJ), and ZEONAR® (Zeon Chemicals, Louisville, KY). Descriptions of plastic channel capillaries may be found, among other places, in U.S. Pat. No. 5,750,015.

As used herein, the term "electro-osmotic flow" (EOF) is fluid flow that is induced by an electrical field, which is also referred to as electro-osmosis or electroosmosis.

As used herein, the term "DNA sequencing fragments" are DNA polynucleotides generated for the purpose of obtaining sequence information about a selected DNA target sequence. Such fragments can be generated enzymatically, e.g., by the Sanger dideoxy method, or chemically, e.g., by the Maxam and Gilbert method. The fragments may originate in a single sequencing reaction (e.g., a dideoxy sequencing reaction performed in the presence of dideoxycytidine triphosphate), or from more than one sequencing reaction (e.g., from four different dideoxy sequencing reactions which include suitably labeled 5'-primers to identify the 3'-terminal base of each fragment).

The term "polymer" used herein, refers to a large molecule composed of smaller monomeric or oligomeric subunits covalently linked together to form a chain. A "homopolymer" is a polymer made up of only one monomeric repeat unit. A "copolymer" refers to a polymer made up of two or more kinds of monomeric repeat unit. Linear polymers homo-polymers and linear co-polymers are composed of one kind of monomeric subunit or at least two kids of monomeric subunits, respectively. The monomeric subunits are linked together in one continuous length to form polymer chains Branched polymers are similar to linear polymers but have side chains protruding from various branch points along the main polymer. Star-shaped polymers are similar to branched polymers except that multiple side branches radiate from a single branch site, resulting in a star-shaped or wheel-and-spoke appearance.

As used herein, the term "crosslinked polymer" is an assembly of a two or more polymer chains that are covalently linked to each other at points other than at their ends. Crosslinking can occur during the polymerization process in the presence of crosslinking agents. At some degree of crosslinking, known as the gel point, gelation occurs. At the gel point, a visible gel or insoluble polymer forms and the system loses fluidity, as measured by the inability of a bubble to rise in it. This crosslinked polymer, which corresponds to the formation of a network of polymer chains that are crosslinked to form a macroscopic molecule, is insoluble in all solvents, even at elevated temperatures.

As used herein, the term "non-crosslinked polymer" is a polymer chain, with or without branching, but excluding polymer chains that are crosslinked together. A non-crosslinked polymer: i) does not contain polymer molecules that are linked at points other than their end; ii) does not undergo gelation during polymerization; and iii) remains fluid and is not elastic, such that bubbles can rise and flow freely within a non-crosslinked polymer system. The non-crosslinked polymers described herein include and are not limited to a "non-crosslinked hydrophilic N-vinyl amide polymer" and "non-crosslinked hydrophilic acrylamide polymer."

As used herein, the term "polynucleotide" is a linear polymer of natural or modified nucleoside monomers, including double and single stranded deoxyribonucleosides, ribonucleosides, α-anomeric forms thereof, and the like. Typically, the nucleoside monomers are linked by phosphodiester bonds or analogs thereof to form polynucleotides, however, peptide nucleic acids are also contemplated. In certain embodiments, polynucleotides range in size from a few monomeric units, e.g., 20, to several thousands of monomeric units. Whenever a polynucleotide is represented by a sequence of letters, such as "ATGCCTG," it will be understood that the nucleotides are in 5'=>3' order from left to right and that "A" denotes deoxyadenosine, "C" denotes deoxycytidine, "G" denotes deoxyguanosine, and "T" denotes deoxythymidine, unless otherwise noted. Analogs of phosphodiester linkages include phosphothioate, phosphodithioate, phosphoselenate, phosphodiselenate, phosphoroanilothioate, phosphoranilidate, phosphooramidite, and the like.

As used herein, the term "single base resolution" ($R_{singlebase}$) is the measurement of resolution between two peaks arising from two polynucleotide fragments that differ in size by one nucleotide. Single base resolution can be determined mathematically using the formula:

$$R_{singlebase} = 2 \times \frac{t_n - t_{n+1}}{W_n + W_{n+1}}$$

wherein $t_n$ is the migration time of a polynucleotide fragment that is n nucleotides in length; $t_{n+1}$ is the migration time of a polynucleotide fragment n+1 nucleotides in length; $W_n$ is the full width at the base of the peak from the polynucleotide fragment n nucleotides in length; and $W_{n+1}$ is the full width at the base of the peak from the polynucleotide fragment n+1 nucleotides in length. "Migration time" is the time that it takes for a polynucleotide fragment to travel the length of the capillary or microchannel, i.e., from the injection point to the detector.

Unless defined otherwise, all technical and scientific terms used herein have the same meaning as is commonly understood by one of ordinary skill in the art. All patents, applications, published applications and other publications referenced herein are incorporated by reference in their entirety unless stated otherwise. In the event that there are a plurality of definitions for a term herein, those in this section prevail unless stated otherwise. As used in the specification and the appended claims, the singular forms "a," "an" and "the" include plural referents unless the context clearly dictates otherwise. Unless otherwise indicated, conventional methods of mass spectroscopy, NMR, HPLC, protein chemistry, biochemistry, recombinant DNA techniques and pharmacology are employed. The use of "or" or "and" means "and/or" unless stated otherwise. Furthermore, use of the term "including" as well as other forms, such as "include", "includes," and "included," is not limiting. As used in this specification, whether in a transitional phrase or in the body of the claim, the terms "comprise(s)" and "comprising" are to be interpreted as having an open-ended meaning. That is, the terms are to be interpreted synonymously with the phrases "having at least" or "including at least." When used in the context of a process, the term "comprising" means that the process includes at least the recited steps, but may include additional steps. When used in the context of a compound, composition, or device, the term "comprising" means that the compound, composition, or device includes at least the recited features or components, but may also include additional features or components. By "consisting of" is meant including, and limited to, whatever follows the phrase "consisting of." By "consisting essentially of" is meant including any elements listed after the phrase, and limited to other elements that do not interfere with or contribute to the activity or action specified in the disclosure for the listed elements. By "about" is meant a quantity, level, value, number, frequency, percentage, dimension, size, amount, weight or length that varies by as much as 30, 25, 20, 15, 10, 9, 8, 7, 6, 5, 4, 3, 2 or 1% to a reference quantity, level, value, number, frequency, percentage, dimension, size, amount, weight or length.

Compositions for Capillary Electrophoresis

Some embodiments of the present application relate to compositions for separating analytes by capillary electrophoresis. In some embodiments, the compositions include a sieving component and a surface interactive component. In certain embodiments, the sieving component comprises a first non-crosslinked hydrophilic acrylamide polymer. In other embodiments, the surface interactive component comprises an interpenetrating polymer network (IPN) including at least one non-crosslinked hydrophilic N-vinyl amide polymer and a second non-crosslinked hydrophilic acrylamide polymer. In some embodiments, the compositions do not include any crosslinked polymer.

The compositions described herein are particularly useful for separating polynucleotides, or other biomolecules having different sizes but similar or identical charge-frictional drag ratios in free solution using capillary electrophoresis. The skilled artisan will appreciate that a charge-carrying component, or electrolyte, is typically included in such compositions. The charge-carrying component is usually part of a buffer system that controls the pH level of the separation medium.

Interpenetrating Polymer Network (IPN)

Figure 1B:
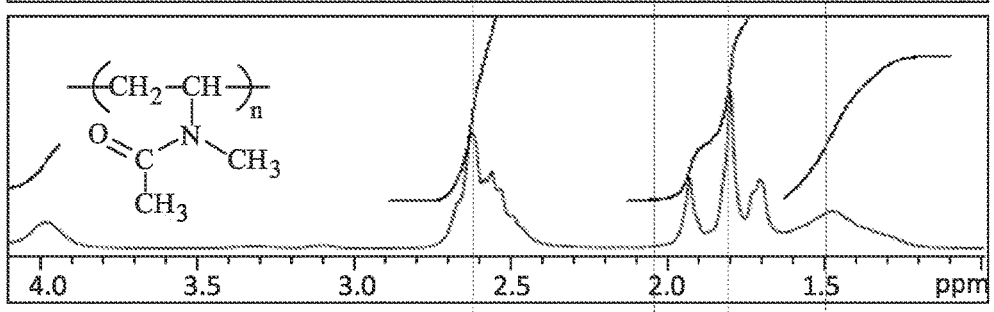
FIG. 1B illustrates a $^1$H NMR spectrum measured in $D_2O$ of a non-crosslinked hydrophilic poly(N-methyl-N-vinylacetamide) according to an embodiment of the present application.
Figure 1C:
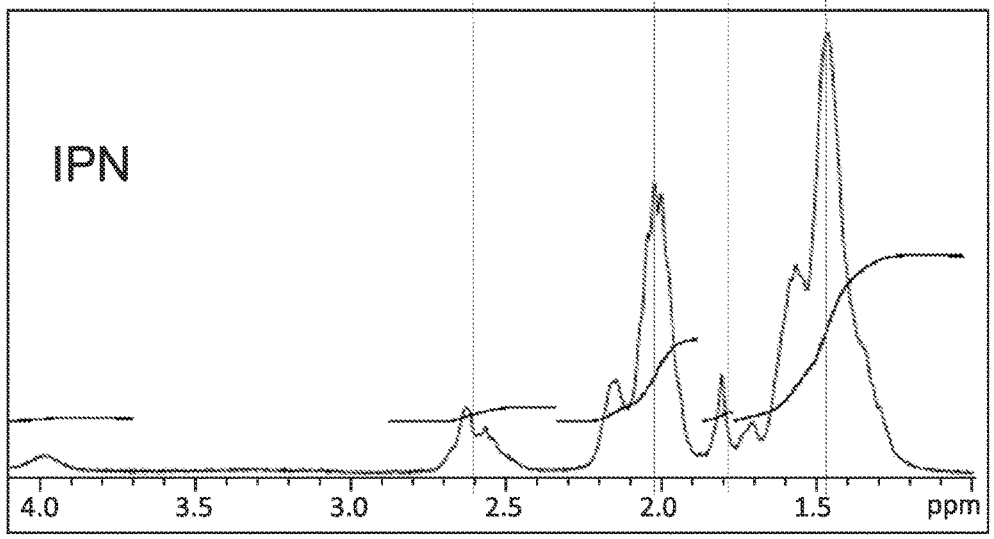
FIG. 1C illustrates a $^1$H NMR spectrum measured in $D_2O$ of an interpenetrating network comprising poly(N-methyl-N-vinylacetamide) and polyacrylamide prepared in a 1:5 weight ratio of poly(N-methyl-N-vinylacetamide) to acrylamide and after 20 hours of boiling acetone extraction in a Soxhlet Extractor, according to an embodiment of the present application.

An "interpenetrating polymer network" is a physical entanglement of two or more polymers each having different chemical compositions, which do not phase separate when dissolved in a solvent. Formation of the physical entanglement of the polymers does not include any chemical reaction or any chemical bond formation. In some embodiments, each of the two or more polymers in the IPN may be a homopolymer or a copolymer. In some embodiments, each of the two or more polymers in the IPN has different chemical composition from another (i.e., one type of polymer has one or more repeating units that is chemically and/or structurally different from a second type of polymer in the IPN). In other embodiments, the two or more polymers in the IPN may share common repeating units (e.g., one type of polymer is a homopolymer and a second type of polymer is a copolymer that contains the same repeating units as the homopolymer). The IPN can be produced by polymerizing at least one first type of monomer in a solution containing a dissolved second polymer (where the dissolved second polymer is prepared from a second type of monomer), for example, the method disclosed in U.S. Pat. No. 6,770,698. A nonlimiting example of IPN formation is the polymerization of acrylamide monomer in a solution containing poly(N-methyl-N-vinylacetamide) to produce an IPN that is a physical entanglement of polyacrylamide and poly(N-methyl-N-vinylacetamide). FIG. 1C is a $^1$H NMR spectrum of an embodiment of the IPN described herein, comprising poly(N-methyl-N-vinylacetamide) and polyacrylamide prepared in a 1:5 weight ratio of poly(N-methyl-N-vinylacetamide) to acrylamide monomer, as compared to FIG. 1A and FIG. 1B, which illustrates a $^1$H NMR spectrum of a non-crosslinked polyacrylamide and a $^1$H NMR spectrum of a non-crosslinked poly(N-methyl-N-vinylacetamide).

Figure 2A:
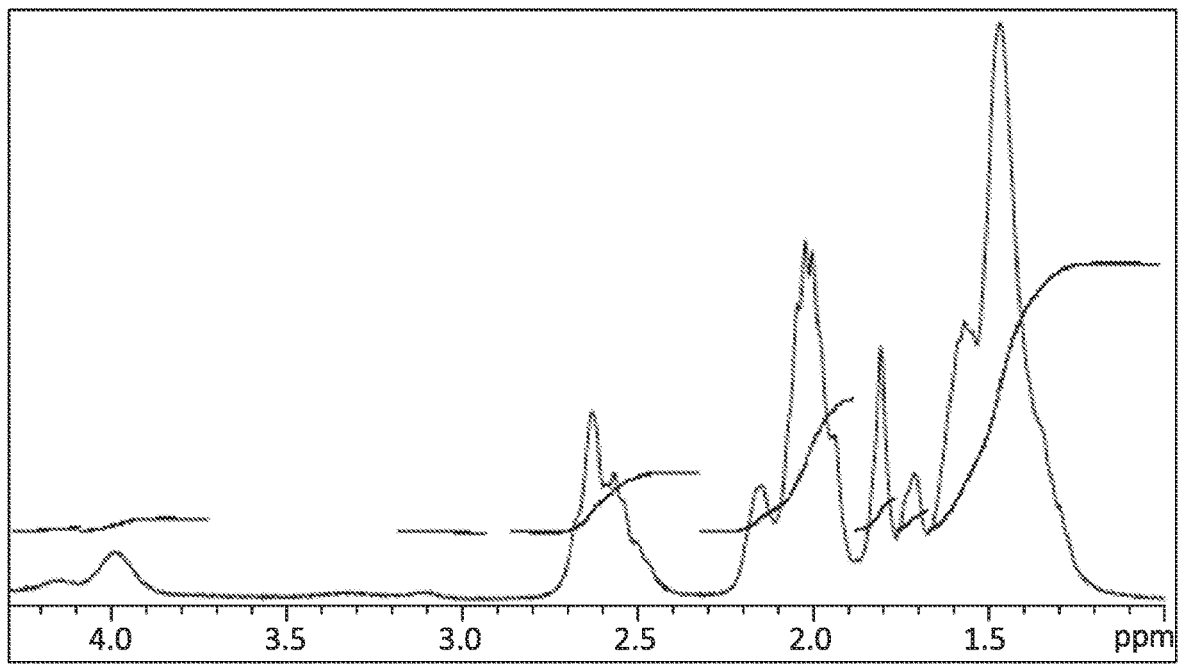
FIGS. 2A and 2B illustrate the $^1$H NMR signals in $D_2O$ for an interpenetrating network comprising poly(N-methyl-N-vinylacetamide) and polyacrylamide before and after 20 hours of boiling acetone extraction in a Soxhlet Extractor respectively.
Figure 2B:
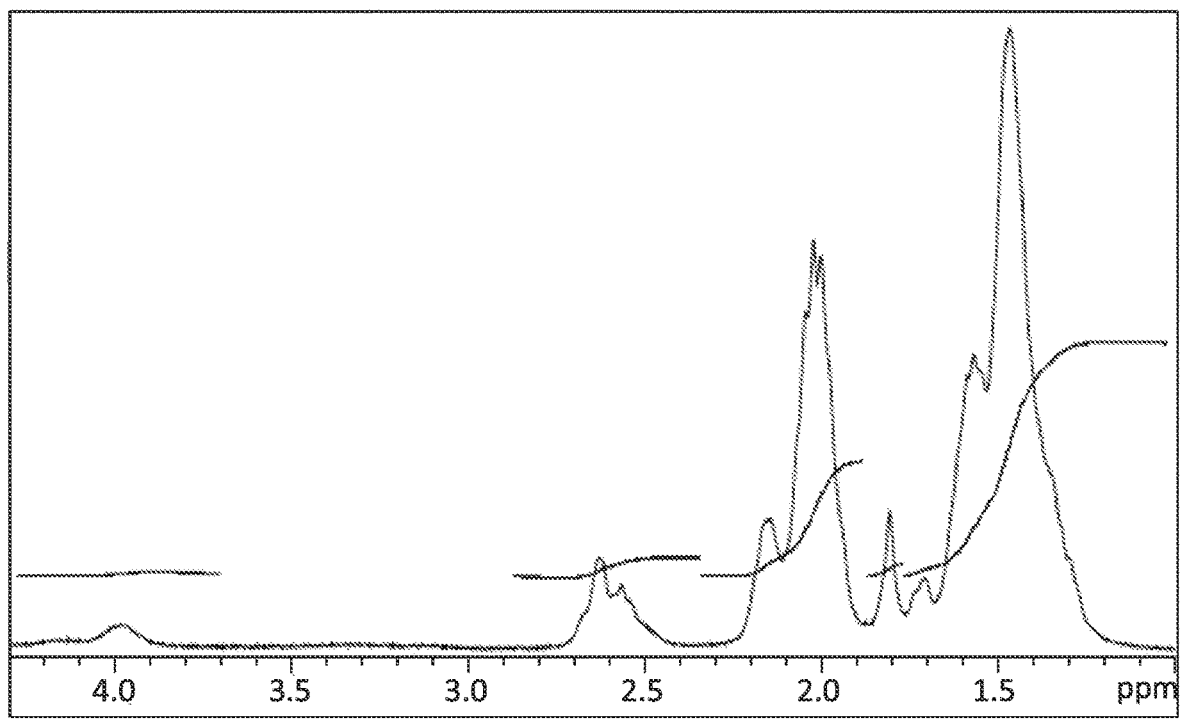

The IPN of the present application may comprise a physically integral IPN. As used herein, the term "physically integral IPN" is an IPN characterized by a state wherein a polymer cannot be extracted from the IPN when exposed to certain conditions that, in the absence of the IPN, readily dissolve such polymer. For example, in the presence of boiling acetone, poly(N-methyl-N-vinylacetamide) (PMVA) is highly soluble, and polyacrylamide is insoluble. As an example, when a physically integral IPN comprising PMVA and polyacrylamide was subject to continuous extraction with boiling acetone for 20 hours, such IPN exhibits no loss of PMVA after 20 hours (FIG. 2A and FIG. 2B respectively). In some embodiments, the two or more polymers of the IPN are stretched polymers. As used herein, the term "stretched polymer" is a polymer that is stretched beyond a resting conformation. The skilled artisan will appreciate that polymers having different chemical compositions exert resistive forces against each other when the polymers are combined. These resistive forces can force the individual chains of the polymers to adopt an extended conformation that has separation properties which are enhanced when compared to the separation properties of the unstretched polymer in a resting conformation. In some embodiments, the IPN comprises stretched polyacrylamide, stretched poly(N-methyl-N-vinylacetamide) or a combination thereof.

The IPN of the present application includes a measured molar ratio of the non-crosslinked N-vinyl amide polymer to a non-crosslinked acrylamide polymer. In some embodiments, the molar ratio of the non-crosslinked N-vinyl amide polymer to the non-crosslinked acrylamide polymer in the IPN is from about 100:1 to about 1:100, from about 1:5 to about 1:80, or from about 1:10 to about 1:60. In further embodiments, the molar ratio of non-crosslinked N-vinyl amide polymer to the non-crosslinked acrylamide polymer in the IPN is from about 1:20 to about 1:40. In one embodiment, the molar ratio of non-crosslinked N-vinyl amide polymer to the non-crosslinked acrylamide polymer in the IPN is about 1:30. In further embodiments, the non-crosslinked acrylamide polymer used in the IPN is the same type of polymer as the non-crossed linked acrylamide polymer used as the sieving component of the capillary electrophoresis compositions. In other embodiments, the non-crosslinked acrylamide polymer used in the IPN is different from the non-crossed linked acrylamide polymer used as the sieving component of the capillary electrophoresis compositions, meaning the acrylamide polymers are different in molecular weight or other physical characterization, even though the acrylamide polymers used in IPN and the sieving component may have the same chemical composition.

The IPN of the present application can be prepared from polymerizing acrylamide monomers in the presence of the non-crosslinked hydrophilic N-vinyl amide polymer, resulting in a network of physically entangled N-vinyl amide polymer and the second non-crosslinked acrylamide polymer. In some embodiments, the IPN is prepared from a weight feed ratio of the non-crosslinked hydrophilic N-vinyl amide polymer to the acrylamide monomer from about 10:1 to about 1:200, from about 5:1 to about 1:100, or from about 1:1 to about 1:50. In some embodiments, the IPN is prepared from a weight feed ratio of the non-crosslinked hydrophilic N-vinyl amide polymer to the acrylamide monomer is from about 1:2 to about 1:6. In one embodiment, the IPN is prepared from a weight feed ratio of the non-crosslinked hydrophilic N-vinyl amide polymer to the acrylamide monomer from about 1:3 to about 1:5.

In some further embodiments, the IPN is prepared from a weight feed ratio of poly(N-methyl-N-vinylacetamide) to acrylamide monomer from about 10:1 to about 1:200, from about 5:1 to about 1:100, or from about 1:1 to about 1:50. In some embodiments, the IPN is prepared from a weight feed ratio of poly(N-methyl-N-vinylacetamide) to acrylamide monomer from about 1:2 to about 1:6. In some embodiments, the IPN is prepared from a weight ratio of poly(N-methyl-N-vinylacetamide) to acrylamide monomer of about 1:3 to about 1:5. The average molecular weight of the IPN may range from 100,000 Daltons (Da) to 10,000,000 Da. In some embodiments, the average molecular weight of the IPN ranges from about 800,000 Da to about 5,000,000 Da, about 1,500,000 Da to about 4,500,000 Da, or from about 2,500,000 Da to about 4,000,000 Da.

The IPN of the present application is readily soluble in aqueous solutions including water. In some embodiments, the water solubility of the IPN is from about 0.1 grams per Liter (g/L) to about 100 g/L, or from about 1 g/L to about 50 g/L, or from about 5 g/L to about 20 g/L.

In any embodiments of the composition described herein, the IPN in the composition is advantageous to suppress electro-osmotic flow (EOF) in a capillary for separating analytes by capillary electrophoresis. In some such embodiments, the composition employing an IPN component as surface interactive component provides at least 5%, 10%, 15%, 20%, 25%, 30%, 35%, 40%, 45%, or 50% decrease in capillary electrophoresis run time as compared that of a composition using the same sieving component but a different surface interactive component without an IPN under the same testing condition, when all other components in the two compositions are the same.

Non-Crosslinked Hydrophilic N-Vinyl Amide Polymer

In some embodiments of the composition described herein, the IPN of the present application may comprise a non-crosslinked hydrophilic N-vinyl amide polymer. The non-crosslinked hydrophilic N-vinyl amide polymer is prepared from one or more N-vinyl amide monomers to produce the polymer having one or more recurring units. In some embodiments, the non-crosslinked hydrophilic N-vinyl amide polymer comprises a recurring unit having the structure of Formula (I):

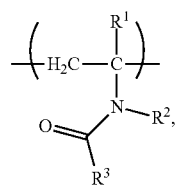

wherein $R^1$ can be independently H or methyl; $R^2$ can be independently H, unsubstituted or substituted $C_1$-$C_6$ alkyl, unsubstituted or substituted phenyl, or —$CH_2C(=O)NR^4R^5$; $R^3$ can be independently unsubstituted or substituted $C_1$-$C_6$ alkyl; and each of $R^4$ and $R^5$ can be independently H, unsubstituted $C_1$-$C_6$ alkyl, or $R^4$ and $R^5$ together with the nitrogen atom to which they are attached form an optionally substituted 5 or 6 membered heterocyclyl. In some embodiments, $R^1$ can be H. In some embodiments, $R^2$ can be methyl. In some embodiments, $R^3$ can be methyl. In one embodiment, $R^1$ is H, and each of $R^2$ and $R^3$ is methyl. In some other embodiments, $R^2$ is —$CH_2C(=O)NR^4R^5$, and $R^4$ and $R^5$ together with the nitrogen atom to which they are attached form a structure selected from

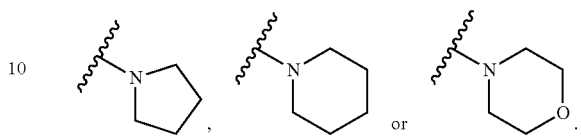

In some embodiments, the non-crosslinked hydrophilic N-vinyl amide polymer comprises a recurring unit selected from the group consisting of N-vinyl-($C_1$-$C_6$ alkyl)amide and N—($C_1$-$C_6$ alkyl)-N-vinyl-($C_1$-$C_6$ alkyl)amide. In further embodiments, the non-crosslinked hydrophilic N-vinyl amide polymer comprises a recurring unit selected from the group consisting of N-vinylacetamide, N-vinylhexamide, N-methyl-N-vinylacetamide, N-methyl-N-vinylpropamide, N-methyl-N-vinylbutamide, N-methyl-N-vinylpentamide, N-methyl-N-vinylhexamide, N-ethyl-N-vinylacetamide, N-ethyl-N-vinylpropamide, N-ethyl-N-vinylbutamide, N-ethyl-N-vinylpentamide, N-ethyl-N-vinylhexamide, N-n-propyl-N-vinylacetamide, N-n-propyl-N-vinylpropamide, N-n-propyl-N-vinylbutamide, N-n-propyl-N-vinylpentamide, N-n-propyl-N-vinylhexamide, N-iso-propyl-N-vinylacetamide, N-iso-propyl-N-vinylpropamide, N-iso-propyl-N-vinylbutamide, N-iso-propyl-N-vinylpentamide, and N-iso-propyl-N-vinylhexamide.

In some embodiments, the IPN described herein does not contain a recurring unit comprising N-vinylpyrrolidone, 3-vinylpyrrolidone, 4-vinylpyrrolidone, 5-vinylpyrrolidone and combinations thereof. In further embodiments, the IPN does not comprise poly(N-vinylpyrrolidone), poly(3-vinylpyrrolidone), poly(4-vinylpyrrolidone), or poly(5-vinylpyrrolidone). In further embodiments, the IPN described herein does not contain any polyvinylpyrrolidone (PVP) or poly(N,N-dimethylacylamide) (PDMA).

In some embodiments, the non-crosslinked hydrophilic N-vinyl amide polymer comprises non-crosslinked poly(N-methyl-N-vinylacetamide) (PMVA).

In some further embodiments, the IPN consists essentially of, or is consisted of a non-crosslinked N-vinyl amide polymer comprising a recurrent unit of Formula (I) (e.g., PMVA) and polyacrylamide, such as linear polyacrylamide (LPA). In some embodiments, the IPN is prepared from a weight feed ratio of PMVA to acrylamide monomer from about 1:2 to about 1:6, or from about 1:3 to about 1:5. In some embodiments, the average molecular weight of the IPN ranges from about 800,000 Da to about 5,000,000 Da, about 1,500,000 Da to about 4,500,000 Da, or from about 2,500,000 Da to about 4,000,000 Da.

Non-Crosslinked Hydrophilic Acrylamide Polymer

In addition to the non-crosslinked acrylamide polymer in the IPN (i.e., the second non-crosslinked acrylamide polymer), the compositions of the present application include a sieving component, which may comprise a non-crosslinked acrylamide polymer (i.e., the first non-crosslinked acrylamide polymer). In some embodiments, both the first and the second non-crosslinked acrylamide polymers are hydrophilic. The chemical constructions of the first non-crosslinked hydrophilic acrylamide polymer and the second non-crosslinked hydrophilic acrylamide polymer can be the same or can be different. In some embodiments, each of first and the second non-crosslinked hydrophilic acrylamide polymer may independently comprise linear polymers such as linear polyacrylamide (LPA), branched polymers, star-shaped polymers, and combinations thereof. In some embodiments, each of first and the second non-crosslinked hydrophilic acrylamide polymer independently comprises a recurring unit having structure of Formula (II):

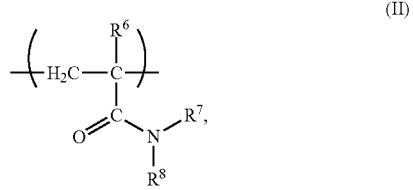

wherein $R^6$ can be independently H or methyl; each of $R^7$ and $R^8$ can be independently H, $C_1$-$C_6$ alkyl, —$(CH_2)_m OH$, —$CH_2CH(OH)(CH_2)_n R^9$, —$CH(CH_2OH)CH(OH)CH_3$, —$CH_2CH_2(OCH_2CH_2)_p$—$OR^{10}$,

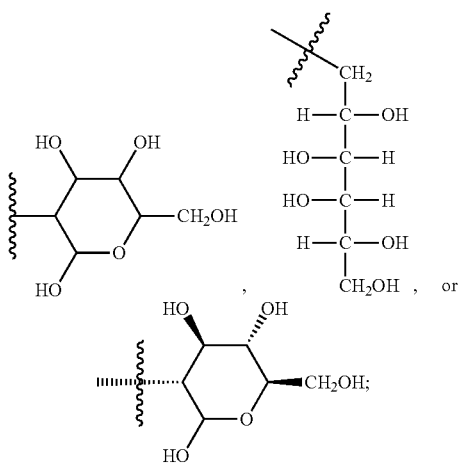

each of $R^9$ and $R^{10}$ can be independently H or $C_1$-$C_6$ alkyl; each of m and n can be independently an integer of 1, 2, 3, 4, or 5; and p can be independently an integer from 1 to 200.

In some embodiments, the first non-crosslinked hydrophilic acrylamide polymer comprises a recurring unit of

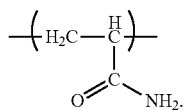

In some embodiments, the second non-crosslinked hydrophilic acrylamide polymer comprises a recurring unit of

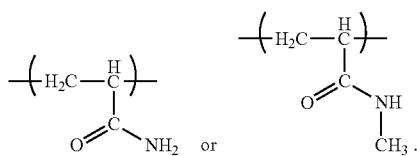

In some embodiments, the first non-crosslinked hydrophilic acrylamide polymer comprises non-crosslinked polyacrylamide. In other embodiments, the first non-crosslinked hydrophilic acrylamide polymer comprises non-crosslinked linear polyacrylamide (LPA).

In some embodiments, the second non-crosslinked hydrophilic acrylamide polymer comprises non-crosslinked polyacrylamide. In other embodiments, the second non-crosslinked hydrophilic acrylamide polymer comprises non-crosslinked linear polyacrylamide (LPA).

In some embodiments, the first or the second non-crosslinked hydrophilic acrylamide may comprise one or more of the recurring units described herein.

The average molecular weight of the first and the second non-crosslinked hydrophilic acrylamide polymer independently ranges from 100,000 Daltons (Da) to 10,000,000 Da. In some embodiments, the average molecular weight of the first non-crosslinked hydrophilic acrylamide polymer of the sieving component or second non-crosslinked acrylamide polymer in the surface interactive component independently range from about 800,000 Da to about 3,000,000 Da, about 1,500,000 Da to about 2,500,000 Da, or from about 1,000,000 Da to about 1,500,000 Da. In certain embodiments, non-crosslinked acrylamide polymers with average molecular weights of 1,000,000 Da or greater can provide improved resolution in separating analytes by capillary electrophoresis. Non-crosslinked acrylamide polymers with average molecular weights of 3,000,000 Da or less provide improved flowability, making such polymers easier to handle and load into uncoated capillaries.

In some embodiments, the first non-crosslinked hydrophilic acrylamide has a molecular weight greater than about 1,000,000 Da and less than or equal to about 3,000,000 Da.

In some embodiments, the second non-crosslinked hydrophilic acrylamide has a molecular weight greater than about 1,000,000 Da and less than or equal to about 3,000,000 Da.

A grafted copolymer includes a network of short chain polymers having a first monomer or polymer attached to a backbone polymer chain that contains a second monomer or polymer, wherein the first and second monomers or polymers are different. The point of attachment in the grafted copolymer may occur by the formation of a chemical bond, a chemical double bond, or multiple chemical bonds. The grafted copolymer may be formed by joining any combination of two or more monomers or polymers by a chemical reaction of a first functional group from a first monomer or polymer with a second function group from a second monomer or polymer. The chemical reaction can be a combination reaction, addition reaction, elimination reaction, termination reaction, a condensation reaction, or other process as determined by one skilled in the art. For the purposes of the present application, the terms "graft copolymer," "grafted copolymer" and "grafting copolymer" have equivalent definitions.

In some embodiments, the composition of the present application does not include a grafted copolymer. In some embodiments, the IPN of the present application does not include a grafted copolymer.

In some embodiments, the composition of the present application or IPN of the present application does not include PVP or PDMA.

In some embodiments of the composition described herein, the sieving component is in an amount from about 0.01% to about 10% w/w of the total weight of the composition, such as about 0.01%, 0.05%, 0.1%, 0.5%, 1%, 2%, 2.02%, 2.04%, 2.06%, 2.08%, 2.1%, 2.12%, 2.14%, 2.16%, 2.18%, 2.2%, 2.22%, 2.24%, 2.26%, 2.28%, 2.3%, 2.35%, 2.4%, 2.45%, 2.5%, 2.6%, 2.7%, 2.8%, 2.9%, 3%, 4%, 5%, 6%, 7%, 8%, 9% or 10% w/w in the composition, or a range defined by any two of the preceding values. In some embodiments, the sieving component is about 0.05% w/w to about 5% w/w, or about 0.1% w/w to about 3% w/w of the composition. In some embodiments, the sieving component is about 2% w/w to about 3% w/w, about 2.04% w/w to about 2.8% w/w, or about 2.1% w/w to about 2.4% w/w of the composition. In some embodiments, the sieving component comprises or is the first non-crosslinked acrylamide polymer. In some embodiments, the first non-crosslinked acrylamide polymer is in an amount from about 0.01% to about 10% w/w of the total weight of the composition, such as about 1%, 2%, 2.02%, 2.04%, 2.06%, 2.08%, 2.1%, 2.12%, 2.14%, 2.16%, 2.18%, 2.2%, 2.22%, 2.24%, 2.26%, 2.28%, 2.3%, 2.35%, 2.4%, 2.45%, 2.5%, 2.6%, 2.7%, 2.8%, 2.9%, 3%, 4%, or 5% w/w of the composition. In some further embodiments, the first non-crosslinked acrylamide polymer is about 0.1% w/w to about 5% w/w, about 1% w/w to about 3% w/w, or about 2% w/w to about 2.5% w/w in the composition. In further embodiments, the sieving component comprises or is LPA. In further embodiments, the LPA has a molecular weight from about 800,000 Da to about 3,000,000 Da, about 1,500,000 Da to about 2,500,000 Da, or from about 1,000,000 Da to about 1,500,000 Da.

In some embodiments of the composition described herein, the surface interactive component is an amount from about 0.001% to about 2% w/w, such as about 0.001%, 0.005%, 0.01%, 0.05%, 0.1%, 0.11%, 0.12%, 0.13%, 0.14%, 0.15%, 0.16%, 0.17%, 0.18%, 0.19%, 0.2%, 0.22%, 0.24%, 0.26%, 0.28%, 0.3%, 0.5%, 1%, 1.5% or 2% w/w of the composition, or a range defined by any two of the preceding values. In some embodiments, the surface interactive component is about 0.001% w/w to about 1% w/w, about 0.01% w/w to about 0.5% w/w, about 0.08% w/w to about 0.3% w/w, about 0.1% w/w to about 0.16% w/w, or about 0.12% w/w of the composition. In some embodiments, the surface interactive component comprises or is an IPN described herein. In further embodiments, the surface interactive component comprises or is a IPN comprising or consisting essentially of, or is consisted of PMVA and polyacrylamide, such as linear polyacrylamide (LPA). In some embodiments, the weight feed ratio of PMVA to LPA from about 1:2 to about 1:6, or from about 1:3 to about 1:5. In some embodiments, the average molecular weight of the PMVA interpenetrated LPA ranges from about 800,000 Da to about 5,000,000 Da, about 1,500,000 Da to about 4,500,000 Da, or from about 2,500,000 Da to about 4,000,000 Da.

In some further embodiments of the composition described herein, the sieving component is about 0.1% w/w to about 5% w/w, about 2% w/w to about 3% w/w, about 2.04% w/w to about 2.8% w/w, or about 2.1% w/w to about 2.4% w/w of the composition. The surface interactive component is about 0.01% w/w to about 1% w/w, about 0.05% w/w to about 0.5% w/w, about 0.08% w/w to about 0.3% w/w, about 0.1% w/w to about 0.16% w/w, or about 0.12% w/w of the composition. In further embodiments, the sieving component comprises or is LPA, having a molecular weight from about 1,500,000 Da to about 2,500,000 Da, or from about 1,000,000 Da to about 1,500,000 Da. In further embodiments, the surface interactive component comprises or is a IPN comprising, consisting essentially of, or is consisted of PMVA and polyacrylamide, such as LPA. In some embodiments, the weight feed ratio of PMVA to LPA from about 1:2 to about 1:6, or from about 1:3 to about 1:5. In some embodiments, the average molecular weight of the PMVA interpenetrated LPA ranges from about 1,500,000 Da to about 4,500,000 Da, or from about 2,500,000 Da to about 4,000,000 Da.

In any embodiments of the composition described herein, the composition may comprise additional components such as one or more denaturants. Denaturants may be useful when it is desirable to prevent the formation of duplexes or secondary structures, for example, with analytes comprising polynucleotides. Exemplary denaturants include formamide, e.g., 40-90%, urea, e.g., 6-8 M, commercially available lactams, such as 2-pyrrolidone, and the like. In some embodiments, the denaturant comprises urea, formamide, 2-pyrollidone, or combinations thereof. In some embodiments, the denaturant comprises urea. Guidance for the use of denaturants in electrophoresis can be found in well-known molecular biology references, e.g., Sambrook et al., Molecular Cloning: A Laboratory Manual, Second Edition (Cold Spring Harbor Laboratory, New York, 1989). In some embodiments, the denaturant is an amount from about 0.1% to about 75% w/w of the total weight of the composition, such as about 0.1%, 1%, 5%, 10%, 15%, 20%, 25%, 30%, 35%, 40%, 45%, or 50% w/w of the composition, or a range defined by any two of the proceeding values. In some further embodiments, the one or more denaturants is about 1% w/w to about 50% w/w, about 10% w/w to about 45% w/w, about 20% w/w to about 40% w/w, or about 25% w/w to about 35% w/w in the composition.

In any embodiments of the composition described herein, the composition described herein has a viscosity of less than 10,000 centipoise, 5000 centipoise, 2500 centipoise, 2000 centipoise, 1950 centipoise, 1900 centipoise, 1850 centipoise, 1800 centipoise, 1750 centipoise, 1700 centipoise, 1650 centipoise, 1600 centipoise, 1550 centipoise, 1500 centipoise, 1250 centipoise, 1000 centipoise, or 600 centipoise (cP) at room temperature (e.g., 25° C.). In some further embodiments, the viscosity of the composition is about 2000 cP, 1950 cP, 1900 cP, 1850 cP, 1800 cP, 1750 cP, 1700 cP, 1650 cP, 1600 cP, 1550 cP, 1500 cP, 1250 cP, 1000 cP, or 600 cP at room temperature (e.g., 25° C.), or within a range defined by any two of the preceding values. In further embodiments, the viscosity of the composition is less than 2000 cP. In one embodiment, the viscosity of the composition is about 1820 cP. In another embodiment, the viscosity of the composition is about 1920 cP. In yet another embodiment, the viscosity of the composition is about 1700 cP. All viscosity measurements were made using a Brookfield Model 64 viscometer (Brookfield Engineering Laboratories, Inc., Middleboro, MA) at ambient or room temperature (e.g., at 25° C.). For compositions having viscosities less than 2000 cP, the spindle speed was 30 rpm. A sufficiently low viscosity of the composition of the present disclosure is desirable for efficient capillary loading.

In some embodiments, the composition is an aqueous solution. In some embodiments, the composition is an aqueous solution that is stable at ambient temperatures or room temperatures for at least 1 month, 2 months, 3 months, 4 months, 5 months, 6 months, or 12 months. In some embodiments, the composition is an aqueous solution that is stable at temperatures from about 0° C. to about 40° C., or from about 5° C. to about 40° C., from about 10° C. to about 30° C., or about 25° C. for at least 1 month, 2 months, 3 months, 4 months, 5 months, 6 months, or 12 months. In certain embodiments, the composition is an aqueous solution that does not phase separate at ambient temperatures or room temperatures. In some embodiments, the composition is an aqueous solution that does not phase separate at temperatures from about 5° C. to about 40° C. (e.g., at room temperature) for about 1 to 8 months, or about 6 months. In comparison, the commercially available POP-7™ would need to be stored at 2-8° C. until ready to use. Storing POP-7™ at ambient temperature for an extended period of time would cause phase separation.

Kits

Some embodiments of the present application relate to kits for capillary electrophoresis. In some embodiments, the kits comprise an uncoated capillary and one of the compositions provided herein. In some embodiments, the uncoated capillary comprises silica, fused silica, quartz, silicate-based glass, phosphate glass, or alumina-containing glass. In some embodiments, the uncoated capillary is a plastic channel capillary. In some embodiments, the kits comprise a plurality of uncoated capillaries.

In further embodiments, the kit includes a composition comprising a sieving component, said sieving component comprising non-crosslinked linear polyacrylamide having a molecular weight greater than 1,000,000 Da and less than or equal to about 3,000,000 Da, a surface interactive component comprising an IPN having non-crosslinked poly(N-methyl-N-vinylacetamide) and non-crosslinked polyacrylamide, and a denaturant comprising urea, and an aqueous buffer. In some embodiments, the aqueous buffer may comprise 3-[tris(Hydroxymethyl)methyl] amino-propanesulfonic acid. In some embodiments, the molar ratio of non-crosslinked poly(N-methyl-N-vinylacetamide) and non-crosslinked polyacrylamide in the IPN is about 1:10 to 1:60, about 1:20 to 1:40, or about 1:30. In some embodiments, the composition of the kit has a viscosity of less than about 2000 cP, 1950 cP, 1900 cP, 1850 cP, 1800 cP, 1750 cP, 1700 cP, 1650 cP, 1600 cP, 1550 cP, 1500 cP, 1250 cP, 1000 cP, or 600 cP at room temperature (e.g., 25° C.). In some further embodiments of the composition described herein, the sieving component is about 0.1% w/w to about 5% w/w, about 2% w/w to about 3% w/w, about 2.04% w/w to about 2.8% w/w, or about 2.1% w/w to about 2.4% w/w of the composition. The surface interactive component is about 0.01% w/w to about 1% w/w, about 0.05% w/w to about 0.5% w/w, about 0.08% w/w to about 0.3% w/w, about 0.1% w/w to about 0.16% w/w, or about 0.12% w/w of the composition. In further embodiments, the sieving component comprises or is LPA, having a molecular weight from about 1,500,000 Da to about 2,500,000 Da, or from about 1,000,000 Da to about 1,500,000 Da. In further embodiments, the surface interactive component comprises or is a IPN comprising, consisting essentially of, or is consisted of PMVA and polyacrylamide, such as LPA. In some embodiments, the weight feed ratio of PMVA to LPA from about 1:2 to about 1:6, or from about 1:3 to about 1:5. In some embodiments, the average molecular weight of the PMVA interpenetrated LPA ranges from about 1,500,000 Da to about 4,500,000 Da, or from about 2,500,000 Da to about 4,000,000 Da.

Methods of Separating Analytes

Some embodiments of the present application relate to methods for separating analytes by capillary electrophoresis. In some embodiments, the methods include separating the analytes by capillary electrophoresis with a composition described herein. In some embodiments, the methods are conducted with one of the kits provided herein. In some embodiments, said separating is carried out in parallel with a plurality of uncoated capillaries. In some embodiments, the methods include inserting an uncoated capillary having a first end and a second end into one of the compositions provided herein. In some embodiments, the methods include loading a sample of different sized analytes in the capillary. In some embodiments, the methods include filling the capillary with the composition prior to loading a sample. In some embodiments, the methods include applying an electrical field between the first and second ends of the capillary so that the different sized analytes in the sample migrate through the capillary, thereby separating the analytes.

In some embodiments, the methods can be employed in preparation for DNA sequencing. In certain embodiments, such sequencing involves separation of single stranded polynucleotides prepared by DNA sequencing protocols. Detailed descriptions of DNA sequencing protocols can be found, among other places, in Automated DNA Sequencing Chemistry Guide (Applied Biosystems, Part No. 4305080); Sambrook et al., Molecular Cloning: A Laboratory Manual, Second Edition (Cold Spring Harbor Laboratory, New York, 1989); Ausbel et al., Current Protocols in Molecular Biology (John Wiley & Sons, 1993, including supplements through August 2000); or the like.

An important feature of certain currently available DNA sequencing protocols is the generation of a "nested series" or "ladder" of single-stranded polynucleotides or DNA fragments, that may be separated by size. The chain-termination methods of DNA sequencing comprise (1) providing an oligonucleotide primer and a template nucleic acid containing, a target nucleic acid whose sequence is to be determined, (2) hybridizing the oligonucleotide primer to the template nucleic acid, (3) extending the primer with a nucleic acid polymerase, e.g., T7 DNA polymerase, Sequenase™, reverse transcriptase, or the like, in a reaction mixture containing nucleoside triphosphate precursors and at least one chain terminating nucleotide to form a nested series of DNA fragment populations, such that every shorter DNA fragment is a subsequence of every longer DNA fragment and such that each DNA fragment of the same size terminates with the same chain-terminating nucleotide, (4) separating the DNA fragment populations according to size, and (5) identifying the chain-terminating nucleotide associated with each DNA fragment population. Once the nested series DNA fragments are generated, they are separated by capillary electrophoresis using the compositions, kits and/or methods of the present application.

In some embodiments of the method described herein, the method uses a composition of kit described herein for DNA sequencing by capillary electrophoresis. In some embodiments, the single base resolution value is from 0.5 to about 1.0 with a DNA fragment having about 50 base to about 100 bases or from about 100 bases to about 750 bases. In further embodiments, the single base resolution value is from 0.6 to about 1.0 with a DNA fragment having about 100 bases to about 600 bases. In further embodiments, the composition described herein provides at least 5%, 10%, 15%, 20%, 25%, or 30% improvement in single base resolution when compared to using POP-7™ under the same conditions. In further embodiments, the composition described herein provides at least 5%, 10%, 15%, 20%, 25%, or 30% reduction in migration time when compared to using POP-7™ under the same conditions.

Apparatuses for carrying out capillary electrophoresis are well-known. Many references are available describing basic apparatuses and several capillary electrophoresis instruments are commercially available, e.g., the Applied Biosystems (Foster City, CA) model 270A, 310, 3100, or 3700 instruments. Exemplary references describing capillary electrophoresis apparatus and their operation include Jorgenson, Methods: A Companion to Methods in Enzymology, 4:179-190 (1992); Colburn et al., Applied Biosystems Research News, issue 1 (winter 1990); Grossman et al. (cited above); and the like.

In some embodiments, a buffer system is employed to control pH and as a charge-carrying component. Exemplary buffers include: aqueous solutions of organic acids, such as citric, acetic, or formic acid; zwitterionics, such as TES (N-tris[hydroxymethyl]-2-aminoethanesulfonic acid, BICINE (N,N-bis[2-hydroxyethyl]glycine, ACES (2-[2-amino-2-oxoethyl)-amino]ethanesulfonic acid), TAPS (3-{[tris(Hydroxymethyl)methyl] amino}-propanesulfonic acid) or glycylglycine; inorganic acids, such as phosphoric; and organic bases, such as Tris (Tris[hydroxymethyl]aminomethane) buffers. Buffer concentration can vary widely, for example between about 1 mM to 1 M. In some embodiments, exemplary buffer solutions for use in the capillary electrophoresis compositions kits and methods of the present application include: (i) 100 mM TAPS, 7 M urea, pH 8.0; or (ii) TTE (50 mM Tris-50 mM TAPS), 7 M urea, pH 8.0.

In certain embodiments, the compositions, kits and methods described herein may be used with, among other things, precoated capillaries. Precoated capillaries are commercially available, for example, from BioRad Life Sciences (e.g., Biocap XL capillaries, catalog no. 148-3081). Capillaries may also be precoated using methods well known in the art. Such procedures are described in, for example, Cobb et al., Anal. Chem. 62:2478 (1990), and Grossman, U.S. Pat. No. 5,347,527.

EXAMPLES

Some aspects of the embodiments discussed above are disclosed in further detail in the following examples, which are not in any way intended to limit the scope of the present disclosure. Those in the art will appreciate that many other embodiments also fall within the scope of the compositions, kits and methods of the present application, as is described herein above and in the claims.

Example 1. Preparation of a Non-Crosslinked Hydrophilic Acrylamide Polymer

A solution of 32.38 g of 40% acrylamide solution (Bio-Rad), 0.080 g of ammonium persulfate (≥98% pure, Sigma Aldrich), and 0.785 g of iso-propanol (>99.7% pure, Alfa Aesar) in 100 mL of distilled water (Arrowhead) in a 250-mL round-bottom flask equipped with a bleeding tube to purge with ultrapure argon for 120 minutes at a flow rate of 143 mL per minute. Polymerization under argon and mechanical stirring was carried out at 50-55° C. oil bath temperature for 90 minutes. The water-clear reaction mixture was diluted with 100 mL of distilled water. The diluted solution was dialyzed with 50 KDa MWCO regenerated cellulose membrane (Spectrum) and lyophilized to give 9.40 g (98.5% yield) of non-crosslinked polyacrylamide with Mw 1,410,000 Da and Mn 688,000 Da (GPC determination by Polymer Standards Service-USA, Inc.).

In a separate experiment, 32.266 g of acrylamide aqueous solution containing 9.219 g acrylamide (Bio-Rad), and 100 mL of distilled water (Arrowhead) were mixed in a 300-mL round-bottom reaction flask, and was purged with ultrapure argon for 120 minutes at a flow rate of 143 mL per minute and mechanical stirring at 118 rpm. After deoxygenation, an aqueous solution of ammonium persulfate (≥98% pure, Sigma Aldrich) containing 4.034 g of ammonium persulfate and 0.415 g of iso-propanol (>99.7% pure, Alfa Aesar) were added to the reaction flask to start polymerization. Polymerization under argon was carried out at 54° C. oil bath for 90 minutes under mechanical stirring at 66 rpm. After polymerization, the viscous reaction mixture was diluted with 100 mL of distilled water. The diluted solution was dialyzed with Spectra/Por-7 regenerated cellulose membrane (50 KDa MWCO) and lyophilized to give 8.41 g of non-crosslinked polyacrylamide (91.2% yield) with Mw 2.12 MDa and Mn 1.21 MDa (GPC determination by Polymer Standards Service-USA, Inc.).

Example 2. Preparation of a Non-Crosslinked Hydrophilic N-Vinyl Amide Polymer N-methyl-N-vinylacetamide (MVA, 98% pure, Sigma Aldrich) was purified by vacuum distillation. A solution of 22.86 g of the vacuum distilled MVA, 0.0363 g of 2,2'-azobis(2-methylpropionamidine dihydrochloride (≥97% pure, Sigma Aldrich) in 100 mL of distilled water (Arrowhead) in a 300-ml round-bottom flask equipped with a bleeding tube to purge with ultrapure argon for 90 minutes at a flow rate of 143 mL per minute. Polymerization under argon and mechanical stirring was carried out at 70° C. oil bath temperature for 18 hours. The water-clear reaction mixture was dialyzed with 50 KDa MWCO regenerated cellulose membrane (obtained from Spectrum) and lyophilized to give 15.83 g (73.6% yield) of non-crosslinked poly(N-methyl-N-vinylacetamide) (PMVA).

Example 3. Preparation of an Interpenetrating Network (IPN) with 1:5 Weight Feed Ratio A solution of 1.008 g of non-crosslinked PMVA prepared in Example 2, 5.010 g of acrylamide (99+% pure, Sigma Aldrich) and 0.012 g of ammonium persulfate (≥98% pure, Sigma Aldrich) in 80 mL of distilled water (Arrowhead) in a 300-ml round-bottom flask equipped with a bleeding tube to purge with ultrapure Argon for 60 minutes at a flow rate of 143 mL per minute. Polymerization under argon and mechanical stirring was carried out at 50-55° C. oil bath temperature for 4 hours. The reaction mixture was diluted with 60 mL of distill water, dialyzed with 50 KDa MWCO regenerated cellulose membrane (obtained from Spectrum) and lyophilized to give 5.062 g (84.2% yield) of an interpenetrating network (IPN) of non-crosslinked PMVA interpenetrated polyacrylamide (1:5 weight feed ratio (WFR) of PMVA to acrylamide monomer). FIGS. 1A, 1B and 1C illustrate $^1$H NMR spectra for the polyacrylamide of Example 1, the poly(N-methyl-N-vinylacetamide) of Example 2 and the acetone-extracted IPN of Example 3, respectively.

Example 4. Preparation of an Interpenetrating Network (IPN) with 1:3 Weight Feed Ratio The procedure of Example 3 was repeated using a solution of 1.008 g of non-crosslinked PMVA prepared in Example 2 and 3.004 g of acrylamide (99+% pure, Sigma Aldrich) to provide an IPN of non-crosslinked PMVA interpenetrated polyacrylamide (1:3 weight feed WFR of PMVA to acrylamide monomer).

Example 5. Extraction of PMVA from an Interpenetrating Network

A 35-mL Soxhlet extractor equipped with a 250-mL round-bottom flask as a boiler was used for extraction. The extraction solvent is acetone, in which free PMVA (i.e., PMVA that is not physically entangled with another polymer), is very soluble and polyacrylamide is not soluble. The extraction was carried out at 56° C., the boiling temperature of acetone, at the rate of ~5 minutes per cycle of 35 mL. An aliquot of 1.498 g of the IPN prepared in Example 3 was extracted for 20 hours (using 240 cycles and 8400 mL of boiling acetone) to remove any free PMVA that is not physically entangled in the IPN. The extracted IPN is vacuum dried to give 0.913 g (61.0% yield) of white fibers. FIGS. 2A and 2B illustrates the $^1$H NMR signals in $D_2O$ of the IPN prepared in Example 3 before and after 20 hours boiling acetone extraction in a Soxhlet Extractor respectively. It was observed that the intensities of the $^1$H NMR signals for PMVA decreased after boiling-acetone extraction, meaning the free PMVA that was not physically entangled in the IPN has been extracted.

Figure 3:
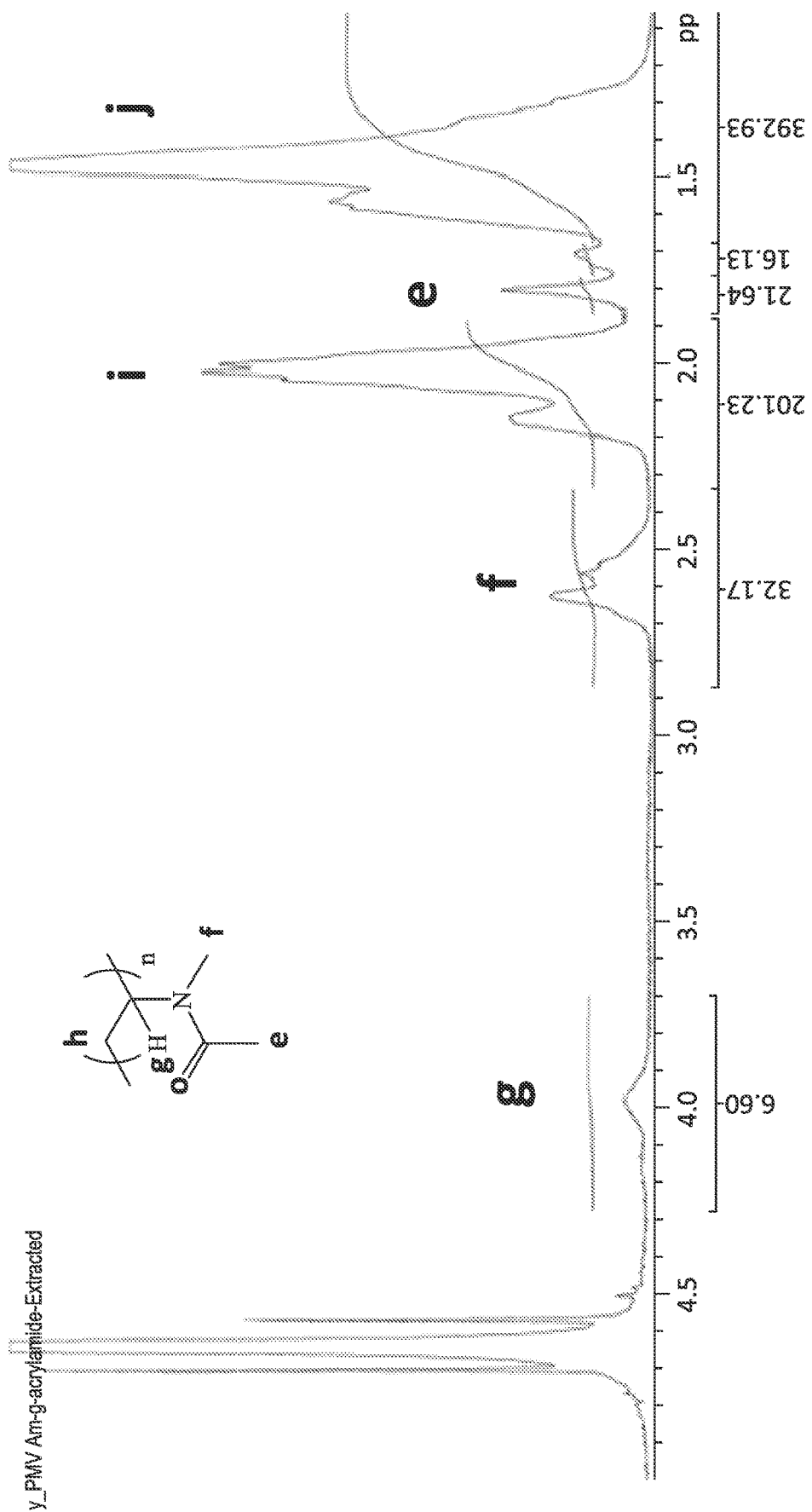
FIG. 3 illustrates the $^1$H NMR spectrum for the interpenetrating network of FIG. 1C including the assignment of chemical shifts of poly(N-methyl-N-vinylacetamide).

FIG. 3 illustrate the $^1$H NMR of acetone extracted IPN network prepared in Example 3 including signal assignment. Comparison of the $^1$H NMR integrations of various signals indicates a molar ratio of 1:30.5 for PMVA to polyacrylamide in the acetone-extracted IPN.

The Soxhlet extraction procedure was repeated using the IPN prepared in Example 4.

Example 6: Preparation of 10× Buffer

A volume of 80 mL of HPLC water (Fisher Chemical) was added to a 100-mL volumetric flask followed by the addition of 24.327 g of N-[Tris(hydroxymethyl)methyl]-3-aminopropansulfonic acid (TCI America) and 0.40 g of EDTA disodium dihydrate (Millipore). The resultant mixture was vortexed at ambient temperature to obtain a clear solution. To this solution was added 2.8 mL of 10 M sodium hydroxide (Sigma-Aldrich) and the mixture was diluted to the 100-mL mark with HPLC water. The buffer was filtered through 0.2 μm Nylon filter prior to use. The pH of the buffer ranged from 8.0 to 8.5.

Example 7: Separation of Analytes by Capillary Electrophoresis

Capillary electrophoresis compositions (Formulations A through E) were prepared as follows. To a 25-mL flat bottom glass vial having a Teflon-lined screw cap were added: the non-crosslinked polyacrylamide prepared in Example 1, the acetone-extracted IPN prepared according to Examples 3, 4 and 5, urea (99.0% pure), 10× Running Buffer prepared according to Example 6 (for Formulation A, the 10× Running Buffer was purchased from Thermo Fisher), and distilled water. The components used for each compositions are summarized in Table 1 below. No phase separation was observed after storing in a refrigerator at 4° C. for 4 months.

The ability of Formulations A through E to separate polynucleotide analytes was determined with an ABI 3130xl capillary electrophoresis apparatus (Applied Biosystems, Foster City, CA) with 61 cm uncoated capillaries (50 cm from the injection end to the detector). Capillary electrophoresis elements were prepared by pumping the compositions through uncoated capillaries for 120 seconds.

Analytes, comprising fluorescently labeled DNA sequencing fragments and a single-stranded DNA sequencing ladder, including 16 DNA fragments of known size, labeled with the fluorescent dye TET, were dissolved in formamide. The analyte solution was injected into the capillary electrophoresis elements at 1.5 kV for 15 seconds. Separations are performed at run temperatures of 50° C. or 60° C., using an electric field of 140 V/cm, 155 V/cm or 170 V/cm.

The peak width (defined as 4 times the standard deviation of a Gaussian peak) and migration time of peaks from the DNA sequencing ladder and fragments were measured. These values were used to calculate single base resolution values. The single base resolution values and migration times for three or four replicate runs were performed at each of the run temperatures. The DNA sequencing performed with Formulations A through E were evaluated using an ABI-3730XL DNA Analyzer (sequencing standard BigDye V.3.1) and were compared to results generated using the same sample with a commercially available Comparative Sample called POP-7™ (Thermo Fisher), a composition comprising polyacrylamide (sieving component) and poly (N,N-dimethylacrylamide) (surface interactive component) as disclosed in U.S. Pat. No. 6,706,162.

Figure 4A:
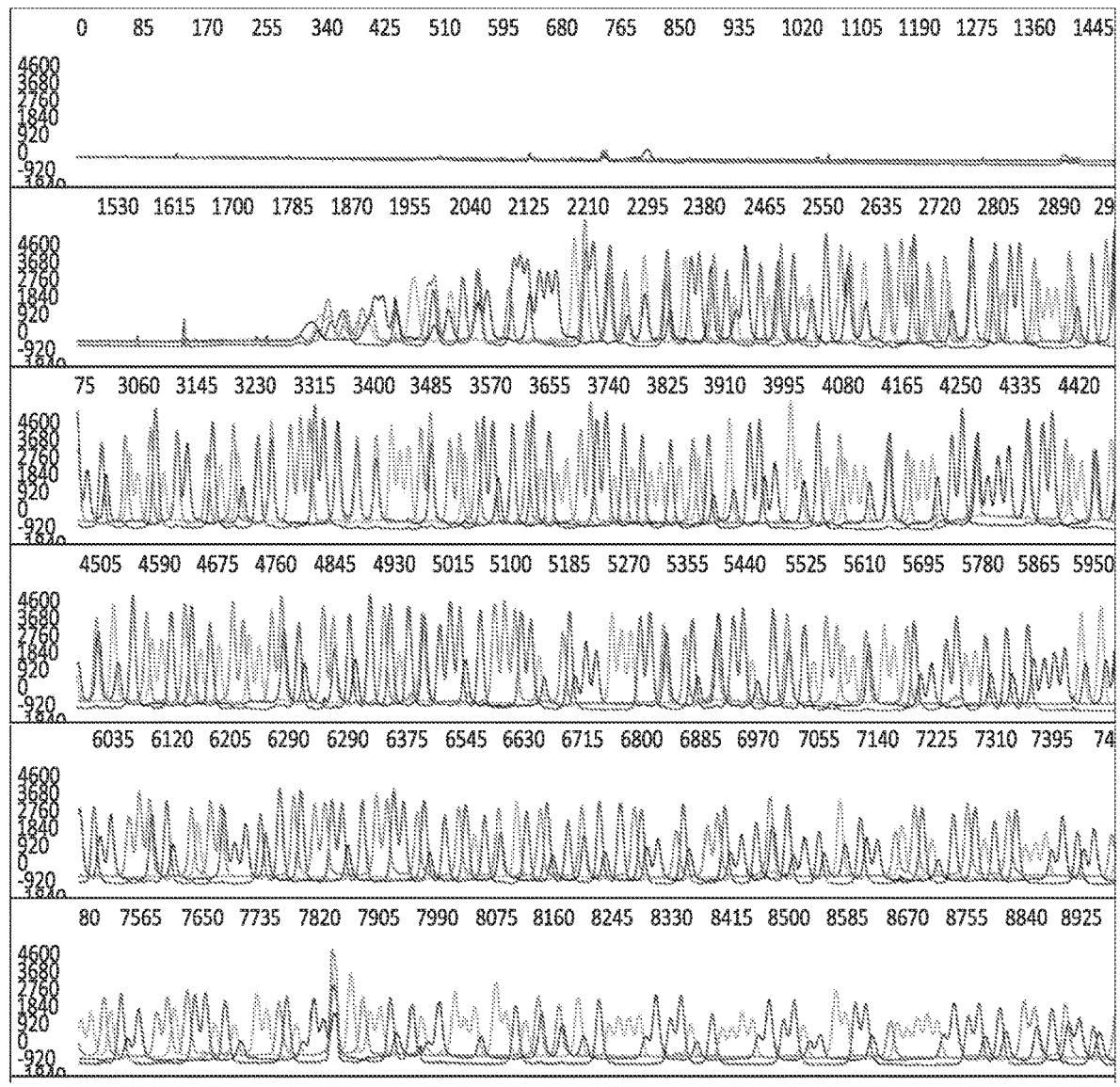
FIG. 4A illustrates the DNA sequencing data using an embodiment of the capillary electrophoresis composition (Formulation A) of the present disclosure.
Figure 4B:
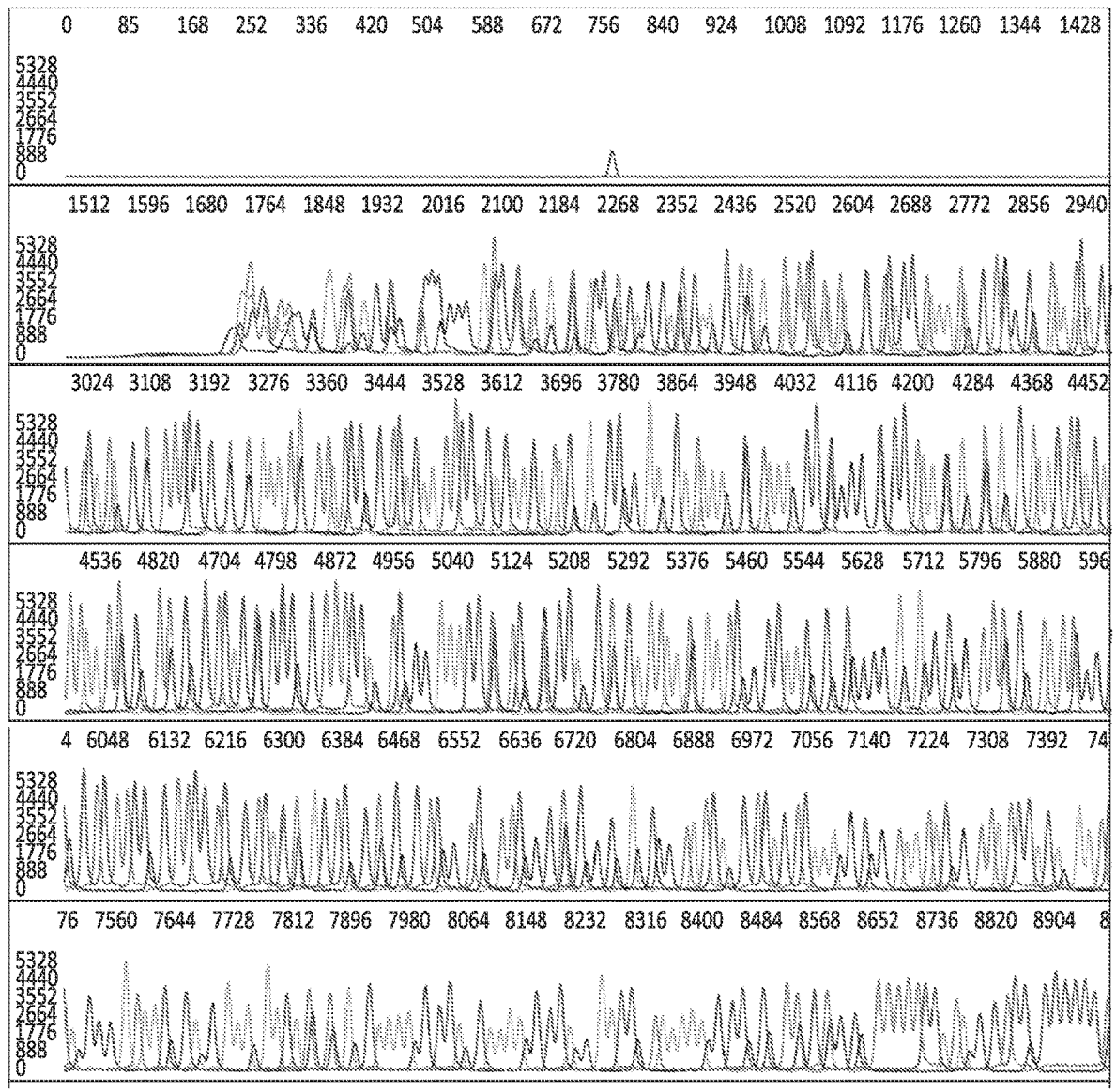
FIG. 4B illustrates the DNA sequencing data using a commercially available reference capillary electrophoresis composition.

FIGS. 4A and 4B illustrate DNA sequencing results for Formulation A and the Comparative Sample, respectively. The DNA sequencing results suggested that Formula A provided comparable base resolution as POP-7™.

Figure 5A:
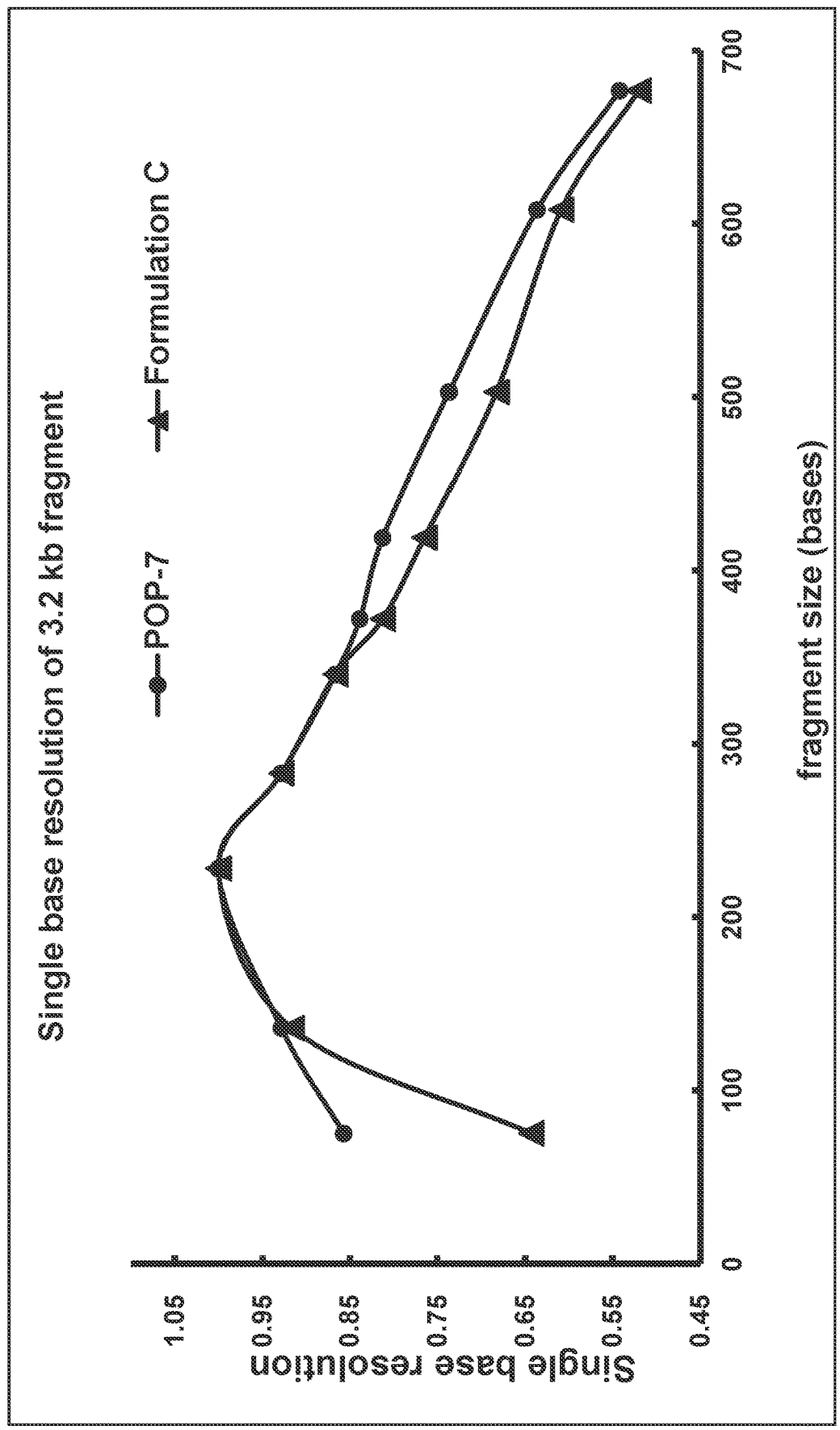
FIG. 5A illustrates the single base resolution value as a function of polynucleotide fragment size, using an embodiment of the capillary electrophoresis composition (Formulation C) of the present disclosure as compared to a commercially available reference capillary electrophoresis composition.
Figure 5B:
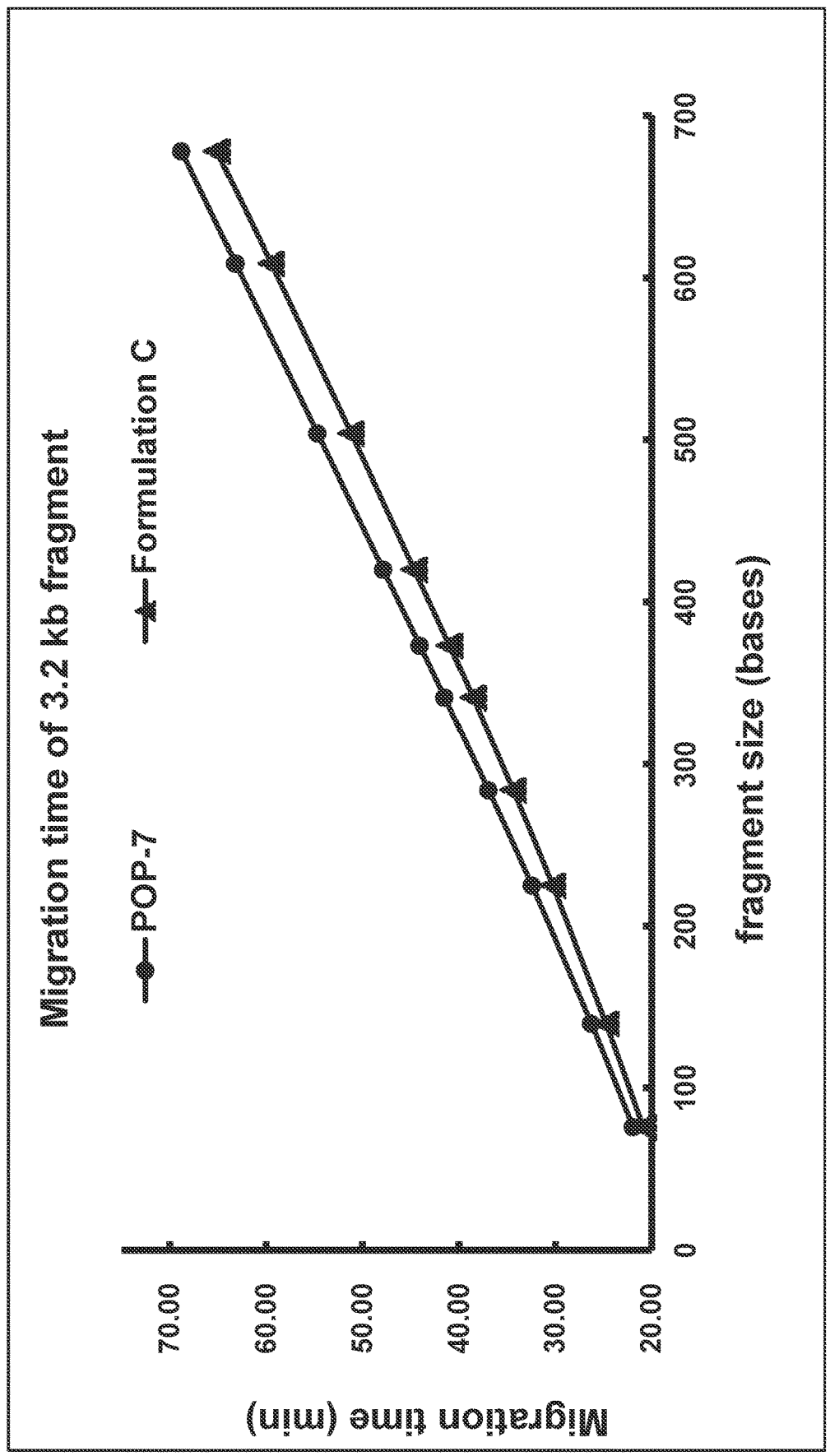
FIG. 5B illustrates the fragment migration time as a function of polynucleotide fragment size, using an embodiment of the capillary electrophoresis composition (Formulation C) of the present disclosure as compared to a commercially available reference capillary electrophoresis composition.

FIGS. 5A and 5B illustrate the single base resolution values and the migration time as a function of polynucleotide fragment size, for Formulation C as compared to POP-7™ respectively. It was observed that Formulation C provided comparable base resolution to POP-7™, and surpassed the minimum resolution requirement for base-to-base separation of peaks (i.e., the horizontal line at 0.5). Furthermore, Formulation C had a faster migration time than POP-7™.

Figure 5C:
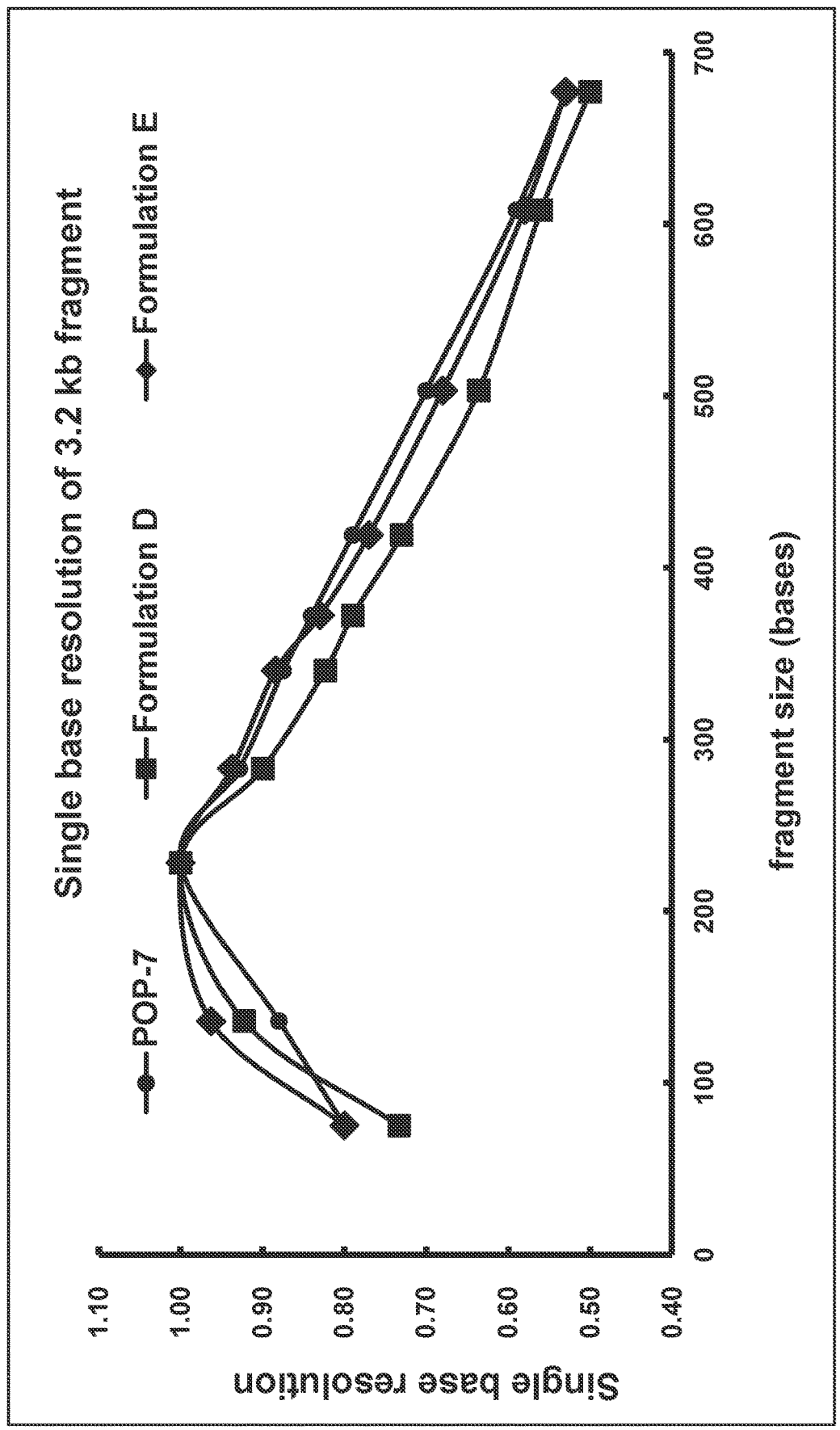
FIG. 5C illustrates the single base resolution value as a function of polynucleotide fragment size, using two different embodiments of the capillary electrophoresis compositions (Formulations D and E) of the present disclosure as compared to a commercially available reference capillary electrophoresis composition.
Figure 5D:
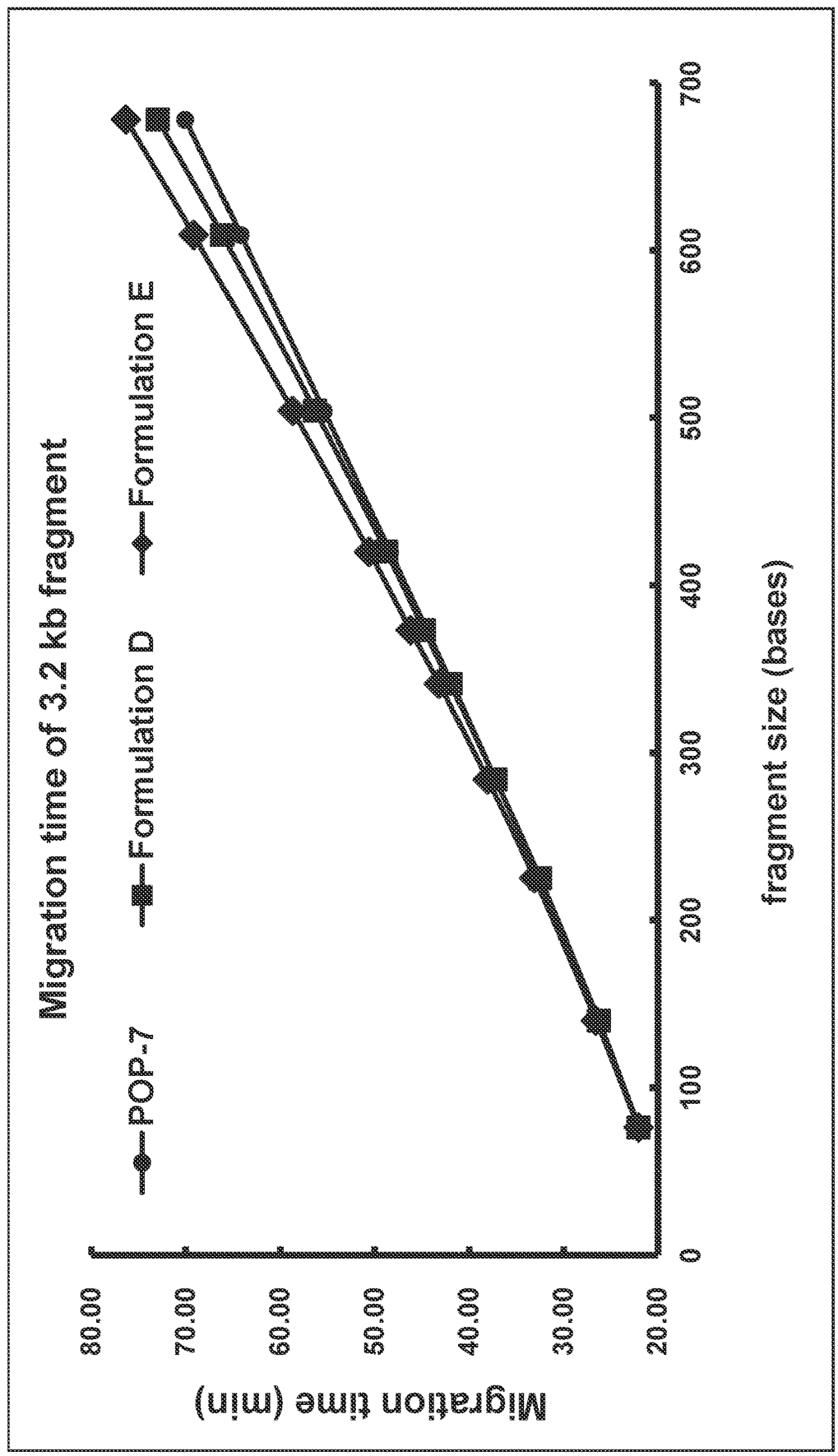
FIG. 5D illustrates the migration time as a function of polynucleotide fragment size, using two different embodiments of the capillary electrophoresis compositions (Formulations D and E) of the present disclosure as compared to a commercially available reference capillary electrophoresis composition.

FIGS. 5C and 5D illustrate the single base resolution values and the migration time as a function of polynucleotide fragment size, for Formulations D and E, as compared to POP-7™ respectively. It was observed that both Formulations D and E provided superior single base resolution than

TABLE 1

| Component | Formulation A | Formulation B | Formulation C | Formulation D | Formulation E |
|---|---|---|---|---|---|
| Non-crosslinked polyacrylamide | 201.4 mg<br>2.00% w/w<br>Mw: 1.41 MDa | 402.7 mg<br>2.05% w/w<br>Mw: 2.12 MDa | 402.1 mg<br>2.04% w/w<br>Mw: 2.12 MDa | 211.2 mg<br>2.15% w/w<br>Mw: 2.12 MDa | 223.9 mg<br>2.28% w/w<br>Mw: 2.12 MDa |
| Acetone-extracted IPN | 21.4 mg<br>0.20% w/w<br>1:5 WFR | 32.2 mg<br>0.16% w/w<br>1:3 WFR | 20.5 mg<br>0.10% w/w<br>1:3 WFR | 12.3 mg<br>0.12% w/w<br>1:3 WFR | 12.4 mg<br>0.12% w/w<br>1:3 WFR |
| Urea | 3.8039 g<br>37.9% w/w | 6.7803 g<br>33.79% w/w | 6.7803 g<br>33.75% w/w | 3.3903 g<br>33.68% w/w | 3.3910 g<br>33.67% w/w |
| 10× Running Buffer | 911.4 mg<br>9.1% w/w | 2.3327 g<br>11.62% w/w | 2.3296 g<br>11.60% w/w | 1.1973 g<br>11.89% w/w | 1.1872 g<br>11.79% w/w |
| Distilled water | 5.0898 g<br>50.8% w/w | 10.5206 g<br>52.42% w/w | 10.5572 g<br>52.55% w/w | 5.2552 g<br>52.21% w/w | 5.2581 g<br>52.22% w/w |

Note:
"w/w" is weight percentage of component in the composition

POP-7™ when the DNA fragment size is about 75 to 250 bases. Furthermore, Formulation E is comparable to POP-7™ at higher DNA fragment size from 250 to about 680 bases.

While the present application has been described with reference to the specific embodiments thereof, it should be understood by those skilled in the art that various changes may be made and equivalents may be substituted without departing from the true spirit and scope of the present application. In addition, many modifications may be made to adapt a particular situation, material, composition of matter, process, process step or steps, to the objective, spirit and scope of the present application. All such modifications are intended to be within the scope of the claims appended hereto.

What is claimed is:

1. A composition for separating analytes by capillary electrophoresis, comprising:
   a sieving component comprising a first non-crosslinked hydrophilic acrylamide polymer; and
   a surface interactive component comprising an interpenetrating polymer network (IPN), the IPN comprising at least one non-crosslinked hydrophilic N-vinyl amide polymer and a second non-crosslinked hydrophilic acrylamide polymer;
   wherein the composition does not include any crosslinked polymer;
   wherein the non-crosslinked hydrophilic N-vinyl amide polymer comprises a recurring unit having the structure of Formula (I):

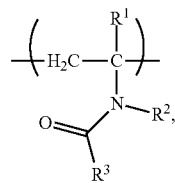

(I)

wherein
   $R^1$ is H or methyl;
   $R^2$ is H, unsubstituted or substituted $C_1$-$C_6$ alkyl, unsubstituted or substituted phenyl, or —$CH_2C(=O)NR^4R^5$;
   $R^3$ is methyl; and
   each of $R^4$ and $R^5$ is independently H, unsubstituted $C_1$-$C_6$ alkyl, or $R^4$ and $R^5$ together with the nitrogen atom to which they are attached form an optionally substituted 5 or 6 membered heterocyclyl.

2. The composition of claim 1, wherein a molar ratio of the non-crosslinked hydrophilic N-vinyl amide polymer to the second non-crosslinked hydrophilic acrylamide polymer in the IPN is from about 1:1 to about 1:200, from about 1:5 to about 1:100, or from about 1:10 to about 1:60.

3. The composition of claim 2, wherein the molar ratio of non-crosslinked hydrophilic N-vinyl amide polymer to the second non-crosslinked hydrophilic acrylamide polymer in the IPN is from about 1:20 to about 1:40.

4. The composition of claim 3, wherein the molar ratio of non-crosslinked hydrophilic N-vinyl amide polymer to the second non-crosslinked hydrophilic acrylamide polymer in the IPN is about 1:30.

5. The composition of claim 1, wherein $R^1$ is H.

6. The composition of claim 1, wherein each of the first and the second non-crosslinked hydrophilic acrylamide polymer independently comprises a recurring unit having structure of Formula (II):

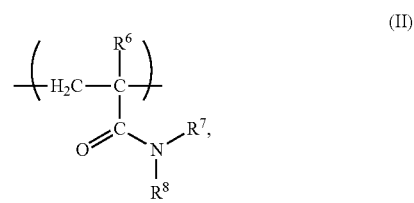

(II)

wherein
   $R^6$ is independently H or methyl;
   each of $R^7$ and $R^8$ is independently H, $C_1$-$C_6$ alkyl, —$(CH_2)_m OH$, —$CH_2CH(OH)(CH_2)_n R^9$, —CH($CH_2OH$)$CH(OH)CH_3$, —$CH_2CH_2(OCH_2CH_2)_p$—$OR^{10}$,

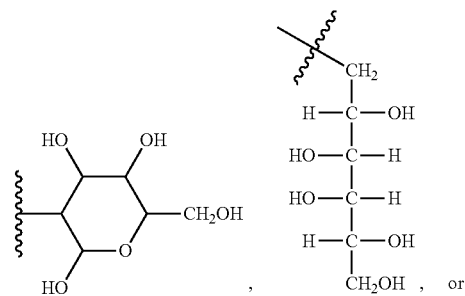

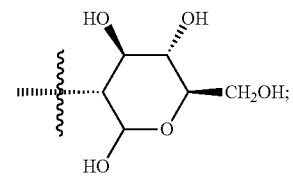

each of $R^9$ and $R^{10}$ is independently H or $C_1$-$C_6$ alkyl;
each of m and n is independently an integer of 1, 2, 3, 4, or 5; and
p is independently an integer from 1 to 200.

7. The composition of claim 6, wherein the first non-crosslinked hydrophilic acrylamide polymer independently comprises a recurring unit of

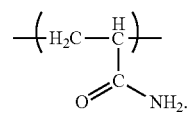

8. The composition of claim 6, wherein the second non-crosslinked hydrophilic acrylamide polymer independently comprises a recurring unit of

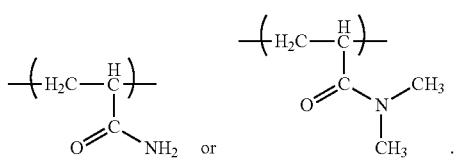

9. The composition of claim 1, wherein the IPN comprises non-crosslinked poly(N-methyl-N-vinylacetamide) and second non-crosslinked polyacrylamide in a molar ratio of about 1:20 to 1:40.

10. The composition of claim 1, wherein the first non-crosslinked hydrophilic acrylamide has a molecular weight greater than about 800,000 Daltons (Da) and less than or equal to about 3,000,000 Da.

11. The composition of claim 1, wherein the composition does not include a grafted copolymer.

12. The composition of claim 1, wherein the sieving component is about 0.05% w/w to about 5% w/w in the composition.

13. The composition of claim 12, wherein the sieving component is about 0.1% w/w to about 3% w/w in the composition.

14. The composition of claim 1, wherein the surface interactive component is about 0.005% w/w to about 1% w/w in the composition.

15. The composition of claim 14, wherein the surface interactive component is about 0.01% w/w to about 0.5% w/w in the composition.

16. The composition of claim 1, further comprising one or more denaturants.

17. The composition of claim 16, wherein the denaturant comprises formamide, urea, or 2-pyrolidinone, or combinations thereof.

18. The composition of claim 1, wherein the IPN comprises a weight feed ratio of the non-crosslinked hydrophilic N-vinyl amide polymer to an acrylamide monomer of about 10:1 to about 1:20, from about 5:1 to about 1:15, from about 1:1 to about 1:10, or from about 1:3 to about 1:5.

19. The composition of claim 1, wherein the composition having a viscosity of less than about 2500 centipoise or less than about 2000 centipoise at about 25° C.

20. A kit for capillary electrophoresis, comprising:
an uncoated capillary; and
a composition according to claim 1.

21. The kit of claim 20, wherein the uncoated capillary comprises silica, fused silica, quartz, silicate-based glass, phosphate glass, alumina-containing glass, or a plastic channel capillary.

22. The kit of claim 20, wherein the composition comprises: a sieving component comprising non-crosslinked linear polyacrylamide having a molecular weight greater than about 800,000 Daltons (Da) and less than or equal to about 3,000,000 Da; a surface interactive component comprising a hydrophilic interpenetrating polymer network (IPN), the IPN comprising non-crosslinked poly(N-methyl-N-vinylacetamide) and non-crosslinked polyacrylamide in a molar ratio of about 1:10 to 1:60; and a denaturant comprising urea.

23. The kit of claim 22, wherein the sieving component in the composition is about 0.1% w/w to about 3% w/w and the surface interactive component in the composition is about 0.01% w/w to about 1% w/w.

24. A method for separating analytes by capillary electrophoresis, comprising:
separating the analytes by capillary electrophoresis with a capillary electrophoresis apparatus, the apparatus comprising:
an uncoated capillary;
a composition according to claim 1 located within the uncoated capillary; wherein the apparatus does not include a crosslinked polymer gel.

25. The method of claim 24, wherein said separating is carried out in parallel with a plurality of uncoated capillaries.

26. A method for separating analytes by capillary electrophoresis, comprising:
inserting an uncoated capillary having a first end and a second end into a composition according to claim 1;
loading a sample of different sized analytes in the capillary; and
applying an electrical field between the first and second ends of the capillary so that the different sized analytes in the sample migrate through the capillary, thereby separating the analytes.

27. The composition of claim 1, wherein $R^2$ is methyl.

* * * * *

UNITED STATES PATENT AND TRADEMARK OFFICE
CERTIFICATE OF CORRECTION

PATENT NO. : 12,092,606 B2
APPLICATION NO. : 18/039691
DATED : September 17, 2024
INVENTOR(S) : Aldrich N. K. Lau et al.

It is certified that error appears in the above-identified patent and that said Letters Patent is hereby corrected as shown below:

In the Specification

Column 6, Line 20, delete "phosphothioate," and insert -- phosphorothioate, --.

Column 6, Line 20-21, delete "phosphodithioate," and insert -- phosphorodithioate, --.

Column 6, Line 22, delete "phosphooramidite," and insert -- phosphoramidite, --.

Column 10, Line 41, delete "dimethylacylamide)" and insert -- dimethylacrylamide) --.

Column 14, Line 13, delete "pyrollidone," and insert -- pyrrolidone, --.

Column 19, Line 27, delete "aminopropansulfonic" and insert -- aminopropanesulfonic --.

In the Claims

Column 23, Lines 5-10 (approx.), Claim 8, delete " 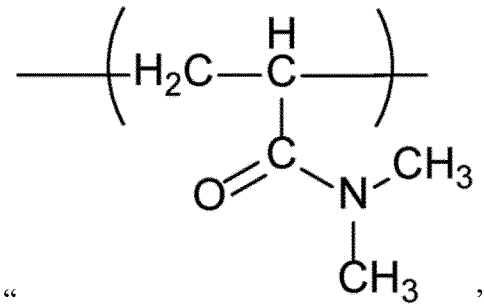 " and insert

Signed and Sealed this
Twenty-ninth Day of April, 2025

Coke Morgan Stewart
*Acting Director of the United States Patent and Trademark Office*

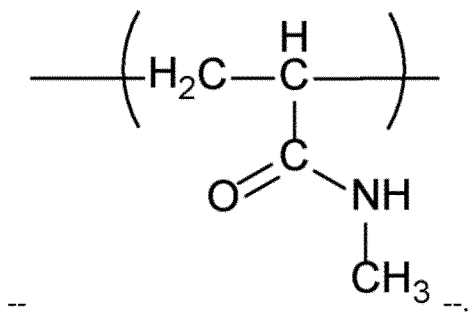
Column 23, Line 37, Claim 17, delete "pyrolidinone," and insert -- pyrrolidinone, --.